(12) United States Patent
Rhee et al.

(10) Patent No.: US 9,253,613 B2
(45) Date of Patent: Feb. 2, 2016

(54) APPARATUS AND METHOD FOR PROVIDING CONFERENCE CALL IN MOBILE COMMUNICATION

(71) Applicant: Samsung Electronics Co. Ltd., Suwon-si, Gyeonggi-do (KR)

(72) Inventors: In-Jong Rhee, Seongnam-si (KR); Kwang-Sub Son, Suwon-si (KR); Jae-Seok Joo, Seongnam-si (KR); Min-Su Shin, Suwon-si (KR); Ju-Seung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 13/762,742

(22) Filed: Feb. 8, 2013

(65) Prior Publication Data

US 2013/0210400 A1     Aug. 15, 2013

(30) Foreign Application Priority Data

Feb. 10, 2012  (KR) .......... 10-2012-0013979
Dec. 12, 2012  (KP) .......... 10-2012-0144228

(51) Int. Cl.
| | |
|---|---|
| *H04M 3/42* | (2006.01) |
| *H04W 4/16* | (2009.01) |
| *H04L 12/18* | (2006.01) |
| *H04M 3/56* | (2006.01) |
| *H04M 1/2745* | (2006.01) |
| *H04M 1/725* | (2006.01) |
| *H04L 29/06* | (2006.01) |

(52) U.S. Cl.
CPC ............ *H04W 4/16* (2013.01); *H04L 12/1822* (2013.01); *H04M 1/72583* (2013.01); *H04M 3/563* (2013.01); *H04L 65/4038* (2013.01); *H04M 1/27455* (2013.01); *H04M 1/274558* (2013.01); *H04M 1/72566* (2013.01); *H04M 3/565* (2013.01); *H04M 2201/38* (2013.01);
(Continued)

(58) Field of Classification Search
CPC .................................. H04M 3/56; H04M 3/46
USPC ............ 455/415, 456.3; 379/204.01, 202.01, 379/204, 211.02, 85, 142.17, 352, 156; 709/204
See application file for complete search history.

(56) References Cited

U.S. PATENT DOCUMENTS

| | | | |
|---|---|---|---|
| 2006/0107221 A1 | 5/2006 | Haug | |
| 2008/0049921 A1* | 2/2008 | Davis et al. .............. | 379/202.01 |

(Continued)

FOREIGN PATENT DOCUMENTS

| | | | |
|---|---|---|---|
| EP | 2 237 533 A1 | 10/2010 | |
| JP | 10207944 A | 8/1998 | |

(Continued)

*Primary Examiner* — Kiet Doan
(74) *Attorney, Agent, or Firm* — Jefferson IP Law, LLP

(57) ABSTRACT

An apparatus and a method for providing a conference call service in a portable terminal are provided. The apparatus includes a communication unit for sending and receiving an IDentifier (ID) of a participant to take part in a conference call, schedule information of the participant, and conference call reservation information by communicating with a conference server, a display unit for outputting the ID, the schedule information, and the conference call reservation information, an input unit for generating input data for selecting the ID, and response data of a conference call connection request, a reservation information generator for identifying a participant to take part in the conference call by detecting the input data for the ID, sending participant information to the conference server, and generating the conference call reservation information including an available conference call schedule by receiving the participant schedule information from the conference server.

17 Claims, 21 Drawing Sheets

(52) U.S. Cl.
CPC ....... *H04M2201/42* (2013.01); *H04M 2250/22* (2013.01); *H04M 2250/62* (2013.01)

(56) References Cited

U.S. PATENT DOCUMENTS

2010/0073454 A1   3/2010   Lovhaugen et al.
2011/0182415 A1*  7/2011   Jacobstein et al. ....... 379/202.01
2011/0270922 A1* 11/2011   Jones et al. ................... 709/204

FOREIGN PATENT DOCUMENTS

| JP | 11015874 A | 1/1999 |
| KR | 20020045929 A | 6/2002 |
| KR | 1020050066918 A | 6/2005 |
| KR | 10-2007-0121439 A | 12/2007 |

* cited by examiner

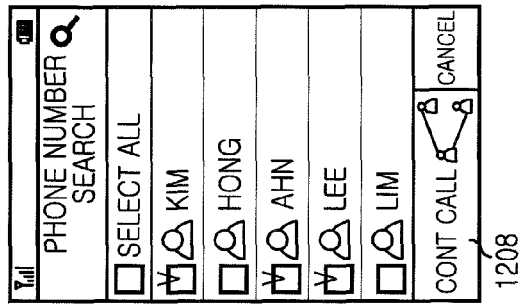
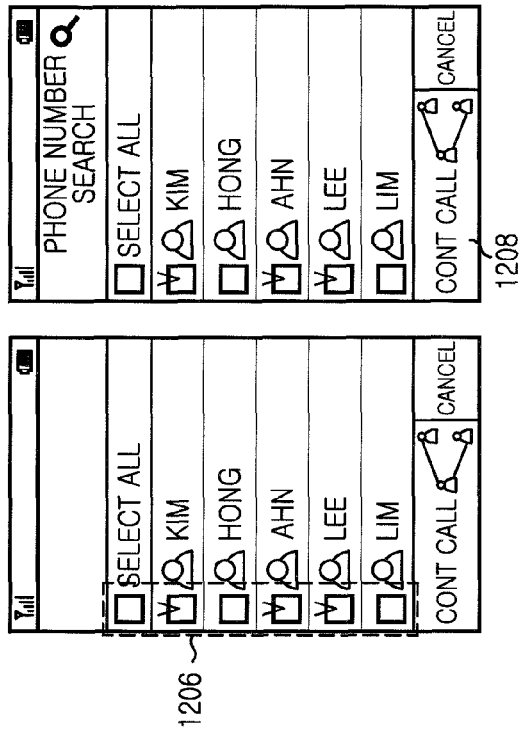
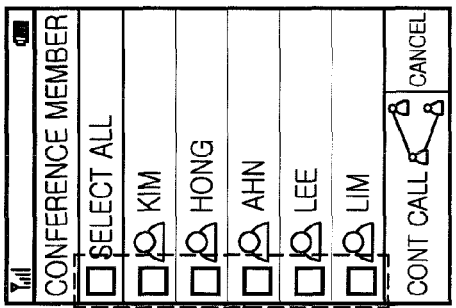
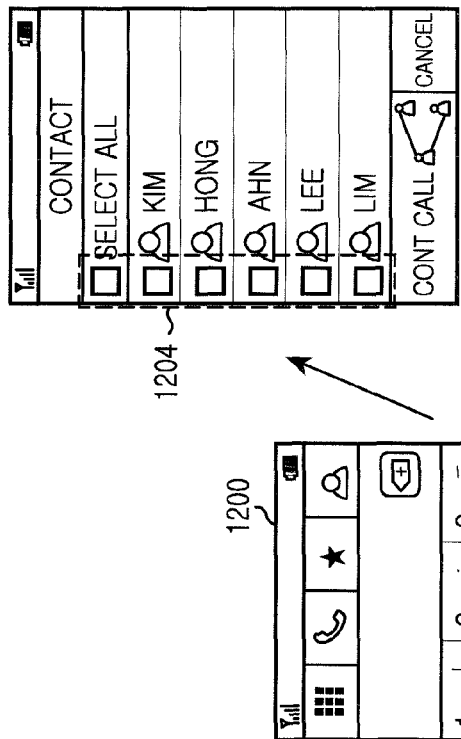
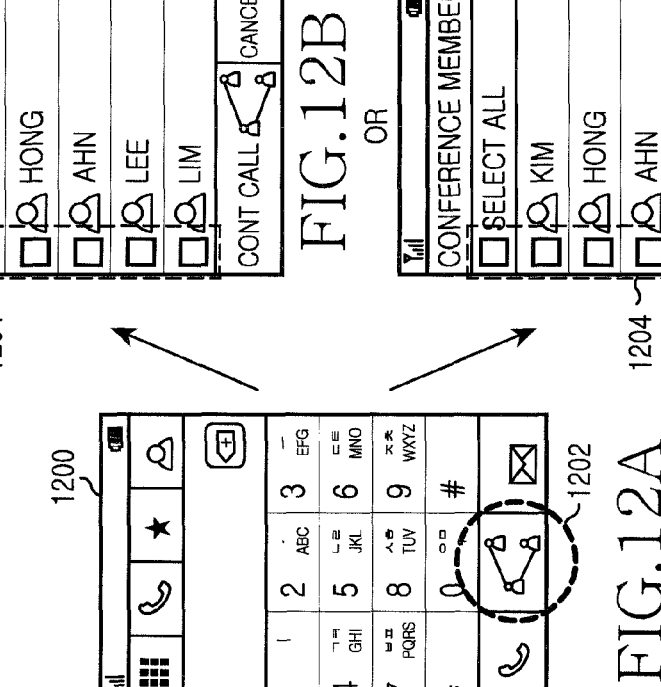

APPARATUS AND METHOD FOR PROVIDING CONFERENCE CALL IN MOBILE COMMUNICATION

PRIORITY

The present application claims the benefit under 35 U.S.C. §119(a) to Korean patent applications filed on Feb. 10, 2012 and Dec. 12, 2012 in the Korean Intellectual Property Office and assigned Serial Nos. 10-2012-0013979 and 10-2012-0144228, the entire disclosure of each of which is hereby incorporated by reference.

BACKGROUND OF THE INVENTION

1. Field of the Invention

The present invention relates to a mobile communication system for providing a conference call service. More particularly, the present invention relates to managing conference calls in mobile devices.

2. Description of the Related Art

Recently, portable terminals are being used by people of all ages as an effective necessity in modern life, and service providers and device manufacturers are competitively developing products (or services) to distinguish themselves from others.

For example, portable terminals are now provided as multimedia devices and thus provide diverse services such as a phonebook, games, a short message, Electronic (E)-mail, morning calls, a Motion Picture Expert Group (MPEG) Audio Layer-3 (MP3) player, a schedule management function, a digital camera, a multimedia message, and a wireless Internet service.

Similarly, a conference call service is available to allow members of a company or general citizens to exchange or discuss their opinion using the portable terminals. Such a service enables attendees (participants) of the conference to have a meeting using telephony or video, without having to meet in person.

To lead the conference call, a user of the portable terminal schedules the conference call by directly contacting the participants and registers the conference call schedule to a conference server. Accordingly, the conference server sends a service path and code to the corresponding participants using e-mail addresses of the participants. The participants of the conference call need to try to connect the conference call on the corresponding date in person.

Such a method directly checks the schedule by contacting the participants and then reserves the conference call schedule. Accordingly, the user who prepares the conference call needs to invest a great deal of time and effort, which negatively impacts the usefulness of the conference call.

To address these issues, an apparatus and a method for simplifying the conference call process in the portable terminal is needed.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the abovementioned problems and/or disadvantages and to provide at least the advantages described below. Accordingly, an aspect of the present invention is to provide an apparatus and a method for enhancing a conference call service quality in a mobile communication system.

Another aspect of the present invention is to provide an apparatus and a method for reserving a conference call in a portable terminal.

Another aspect of the present invention is to provide an apparatus and a method for scheduling a conference call using schedule information of a participant in a portable terminal.

Another aspect of the present invention is to provide an apparatus and a method of a conference server for inducing a conference call participant to take part in a conference call.

According to an aspect of the present invention, an apparatus for a conference call service in a portable terminal is provided. The apparatus includes a communication unit for sending and receiving an IDentifier (ID) of a participant to take part in a conference call, schedule information of the participant, and conference call reservation information by communicating with a conference server, a display unit for outputting the ID, the schedule information, and the conference call reservation information, an input unit for generating input data for selecting the ID, and response data of a conference call connection request, a reservation information generator for identifying a participant to take part in the conference call by detecting the input data for the ID, sending participant information to the conference server, and generating the conference call reservation information including an available conference call schedule by receiving the participant schedule information from the conference server, and a controller for obtaining the ID and controlling to register the conference call reservation information generated by the reservation information generator, to the conference server. The ID includes at least one of an ID stored in the portable terminal, an ID registered with a web site, an ID stored in a cloud system, and an ID registered with a groupware application.

According to another aspect of the present invention, an apparatus for providing a conference call service in a conference server is provided. The apparatus includes a server controller for, when receiving participant information of a conference call from a host terminal which hosts the conference call, receiving participant schedule information by requesting schedule information from each participant terminal, and controlling to send the received participant schedule information to the host terminal, and a reservation manager for receiving from the host terminal, registering, and managing conference call reservation information. The server controller controls to send the conference call reservation information received from the host terminal, to a participant terminal, and to send a conference call connection request to the host terminal and the participant terminal when the conference call is conducted.

According to another aspect of the present invention, a method for a conference call service in a portable terminal is provided. The method includes obtaining an ID of a user, identifying a participant to take part in a conference call by detecting input data of the ID, and sending participant information to a conference server, receiving participant schedule information from the conference server and generating conference call reservation information including an available conference call schedule, and registering the generated conference call reservation information to the conference server. The ID includes at least one of an ID stored in the portable terminal, an ID registered with a web site, an ID stored in a cloud system, and an ID registered with a groupware application.

According to another aspect of the present invention, a method for a conference call service in a conference server is provided. The method includes when receiving participant information of a conference call from a host terminal which hosts the conference call, requesting schedule information from each participant terminal, receiving from a participant and sending the schedule information to the host terminal, receiving from the host terminal, registering, and managing, conference call reservation information, sending the conference call reservation information received from the host terminal, to a participant terminal, and sending a conference call connection request to the host terminal and the participant terminal when the conference call is conducted.

According to another aspect of the present invention, an electronic device for providing a conference call function is provided. The electronic device includes at least one processor, a memory, and at least one program stored in the memory and configured for execution by the at least one processor. The program includes an instruction for displaying a menu which requests to perform at least one of conference call schedule registration, participant registration, conference call execution, and conference call control, and for performing an operation corresponding to the displayed menu. The program includes an instruction for registering an ID selected by a user from participant IDs registered to a memory and a network, with a participant list.

According to another aspect of the present invention, an electronic device for providing a conference call function is provided. The electronic device includes at least one processor, a memory, and at least one program stored in the memory and configured for execution by the at least one processor. The program includes an instruction for displaying a main screen which includes at least one of a region for displaying a conference call candidate list, a region for searching for a conference call participant, a region for displaying a list of participants selected as conference call members, and a region for displaying a conference call execution menu, adding a user selected in the displayed candidate list when a user is selected, to a list of participants selected, and conducting a conference call with the user added to the list of the selected participants.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 12A-12E depict a portable terminal for conducting a conference call according to an exemplary embodiment of the present invention;

Throughout the drawings, like reference numerals will be understood to refer to like parts, components and structures.

DETAILED DESCRIPTION OF EXEMPLARY EMBODIMENTS

Figure 1:
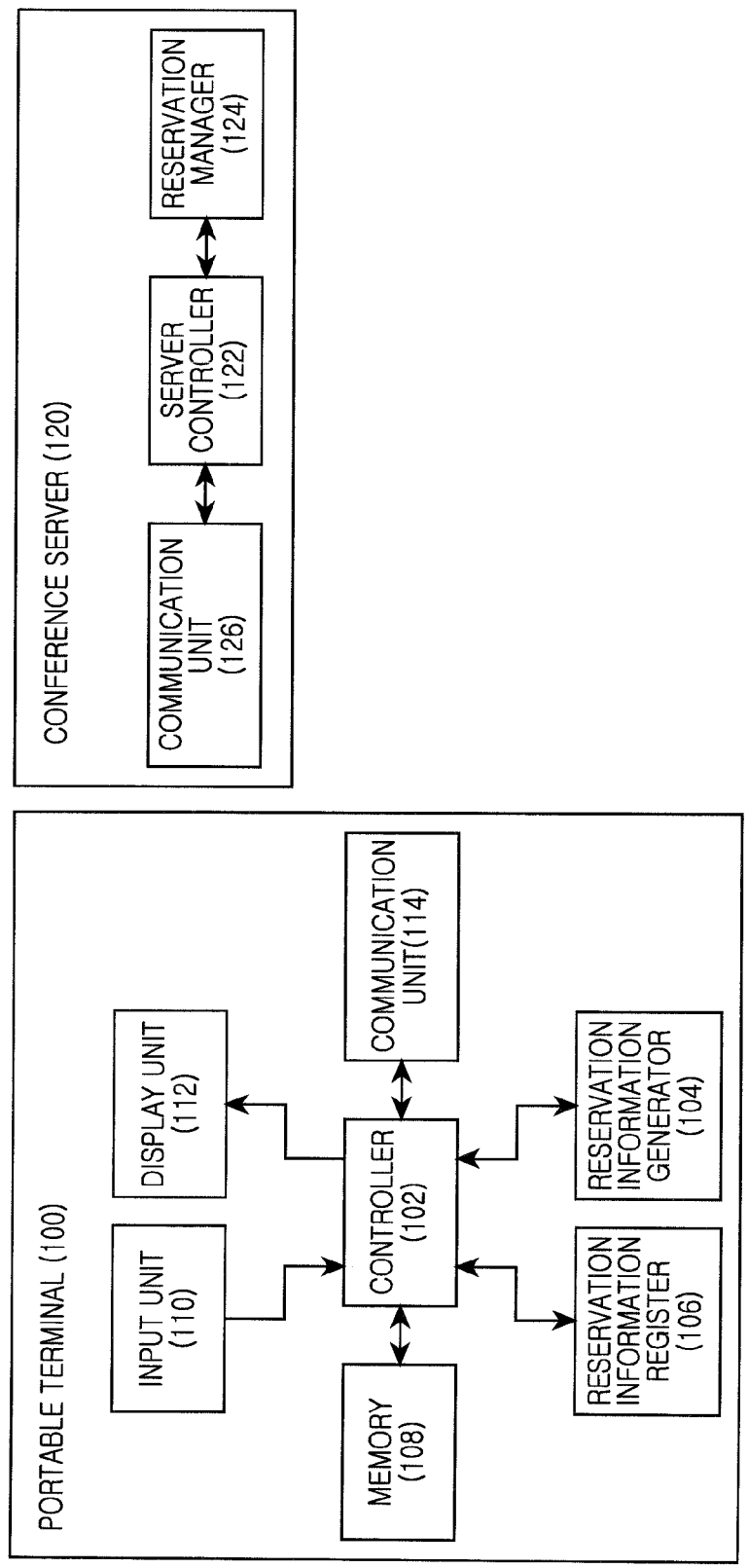
FIG. 1 is a block diagram of a mobile communication system for providing a conference call service according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a mobile communication system for reserving a conference call in a portable terminal and controlling a conference server to send a conference call connection request to a conference call participant, in order to enhance a conference call service quality in the mobile communication system.

A portable terminal according to exemplary embodiments of the present invention reserves a conference call schedule using an IDentifier (ID) of a participant. The ID of the participant indicates information for identifying a called user, and may use phone book information registered in the portable terminal, a recent call list, a user's phone number registered in a bookmark, information of incoming/outgoing messages, user's e-mail information, a user's ID, an account, and a recent conference record. In addition, the ID of the participant may include address book information registered on the web (e.g., a web site), information stored with a cloud system, and user information registered with a groupware application, as well as information stored in the portable terminal.

The portable terminal may be an electronic device such as a mobile terminal, a media player, a tablet computer, a handheld computer, or a Personal Digital Assistant (PDA). The portable terminal may also be a portable electronic device which incorporates two or more functions of the above devices.

FIG. 1 is a block diagram of a mobile communication system for providing a conference call service according to an exemplary embodiment of the present invention.

Referring to FIG. 1, the mobile communication system may include a portable terminal 100 and a conference server 120.

The portable terminal 100 may include a controller 102, a reservation information generator 104, a reservation information register 106, a memory 108, an input unit 110, a display unit 112, and a communication unit 114.

The controller 102 of the portable terminal 100 controls operations of the portable terminal 100. For example, the controller 102 processes and controls voice call and data communication. In addition to these functions, the controller 102 processes to reserve a conference call according to a conference call schedule.

In addition, when receiving a conference call connection request from the conference server 120, the controller 102 processes to participate in the conference call by accepting the conference call connection request.

The operations of the controller 102 may be classified according to the portable terminal which hosts the conference call and the portable terminal which participates in the conference call.

The controller 102 of the portable terminal which hosts the conference call provides participant information (IDentifier (ID) information) of the conference call to the conference server 120 and receives participant schedule information through the conference server 120. The controller 102 processes to provide conference call reservation information (available conference call date and time) to the user using the received participant schedule information.

In so doing, the controller 102 may add and provide a conference call menu to a dial screen for inputting a phone number for the call connection. Accordingly, the controller 102 may obtain participant IDs pre-stored using a menu output on the dial screen, or participant IDs registered in the web or a cloud system, and then select a user to participate in the conference call.

When a conference call function is executed, the controller 102 displays a main screen including a region for displaying a list of the conference call candidates, a region for searching for a conference call participant, a region for displaying a list of participants selected as conference call members, and a region for displaying an execution menu of the conference call.

The controller 102 displays the list of the conference call member candidates in the region for displaying the candidate list, and adds and displays the user selected in the displayed candidate list, in the region for displaying the list of the selected participants.

The controller 102 displays as the candidate list, contact information pre-stored (phone book information, recent call list, user's phone number registered in the bookmark, incoming/outgoing message information, user's e-mail information, user ID, account, and user information in the recent conference record) and information registered to a network database (groupware, cloud system, and web address book), and updates the conference call participant list immediately upon detecting a user's gesture to select the participant. The controller 102 may also process to exclude the participant selected on the list of the selected participants from the conference call participant list.

In addition, by detecting the user's gesture for the execution menu of the conference call, the controller 102 may control to immediately execute the conference call with the selected participant to conduct the conference call with the selected participant on a preset date, and to manage a conference call history. The management of the conference call history includes managing not only a reserved conference call list but also a completed/cancelled conference call list. To reserve the conference call, the controller 102 may register information relating to the participant and the schedule of the conference call to the conference server. For example, the controller 102 may control to store the information relating to the participant and the schedule of the conference call, and then to conduct the conference call by sending the information to the conference server on a preset date.

The controller 102 gets involved merely in the conference call execution (participant selection and schedule selection). The actual conference call connection is received at another device (which may include a general phone without the conference call function). The controller 102 changes the conference connection number of the host or the participant and controls to connect the conference call to the changed connection number.

The controller 102 of the portable terminal participating in the conference call controls to provide schedule information (e.g., schedule information allowing the conference call) to the portable terminal which hosts the conference call, via the conference server 120. When receiving the reservation information indicating the conference call schedule from the conference server 120, the controller 102 controls to register the conference call schedule in association with a schedule function and an alarm function.

The reservation information generator 104, which is a module operating when the portable terminal hosts the conference call, generates the conference call participant information and the conference call reservation information. For example, the reservation information generator 104 identifies the participant for the conference call by detecting the participant ID selection, and controls to receive the schedule information of the participant by sending the identified information to the conference server 120.

The reservation information generator 104 processes to extract the conference call schedule allowing all of the participants to participate in the conference call by analyzing the participant schedule information received from the conference server 120, and to reserve the conference call by sending the conference call reservation information, which is the schedule selected by the user, to the conference server 120.

In so doing, the reservation information generator 104 may identify the participant of the conference call by loading the participant ID stored in the portable terminal, and identify the participant of the conference call by requesting and receiving the participant ID registered with the web or the cloud system.

The reservation information register 106, which is a module operating when the portable terminal is selected as the participant of the conference call, processes the conference call reservation information, which is received from the conference server 120, in association with a schedule management function. For example, the reservation information register 106 may register the received conference call reservation information with an alarm to notify the user before the conference call begins.

The memory 108 stores a program microcode for the processing and the controlling of the controller 102, the reservation information generator 104, and the reservation information register 106. The memory 108 may also store various reference data and temporary data generating in the program executions. The memory 108 stores updatable storage data such as a phone book, alarm information, schedule information, outgoing messages, and incoming messages. The memory 108 also stores the participant IDs for the conference call, the conference call reservation information, and the reserved conference call information (participants, date reserved, and so on).

The input unit 110 provides input data generated by the user's selection to the controller 102. For example, the input unit 110 may include a keypad for receiving the input data from the user. When the display unit 112 includes a touch screen, the input unit 110 may include an object (e.g., soft key) of a user interface output on the display unit 112. The input unit 110 provides the controller 102 with key input data for selecting the user to participate in the conference call and response data of the conference call connection request.

The display unit 112 displays status information, characters, videos, and still images generating during the operations of the portable terminal 100. The display unit 112 may employ a color Liquid Crystal Display (LCD), an Active Matrix Organic Light-Emitting Diode (AMOLED), and so on. When the display unit 112 includes a touch input device and is applied to a touch-type portable terminal, the display unit 112 may be used an input device. In addition, the display unit 112 outputs the user's ID to participate in the conference call, the participant schedule information, and the conference call reservation information.

The communication unit 114 sends and receives radio signals of the input/output data over an antenna (not shown). For example, for transmission, the communication unit 114 channel-encodes, spreads, Radio Frequency (RF)-processes, and transmits data. In reception, the communication unit 114 converts the received RF signal to a baseband signal and restores the data by de-spreading and channel-decoding the baseband signal. In addition, the communication unit 114 transmits and receives information for the conference call reservation by communicating with the conference server 120. The information for the conference call reservation includes the conference call participant information (ID information), the participant schedule information, and the conference call reservation information. The communication unit 114 sends and receives the ID of the registered participant by accessing the web or the cloud system.

While the controller 102 of the portable terminal 100 may function as the reservation information generator 106 and the reservation information register 106, these elements are separately illustrated here to distinguish various exemplary functions of exemplary embodiments of the present invention, not to limit the scope of the invention. One skilled in the art should understand that various modifications can be made without departing from the spirit and scope of the invention. For example, the controller 102 may process all of the functions of the reservation information generator 106 and the reservation information register 106.

The controller 102, the reservation information generator 104, and the reservation information register 106 of the portable terminal 100 may be operated by the program(s) stored in the memory 108. The program is a set of instructions and may be expressed as an instruction set.

The conference server 120 may include a server controller 122, a reservation manager 124, and a communication unit 126.

The server controller 122 of the conference server 120 controls operations for conducting the conference call. According to an exemplary embodiment of the present invention, the server controller 122 controls to reserve the conference call and to send the conference call connection request to the participant of the conference call at the point of the conference call.

The server controller 122 controls to forward the conference call reservation information received from the host (the conference call host terminal) to the participants. If necessary, the server controller 122 may control to generate the reservation information which is the available conference call schedule by receiving the schedule information from the participant and the host, and to provide the generated reservation information to the host and the participant.

The server controller 122 sends a message notifying that the conference call will be received before the conference call begins, to every participant including the host. When the host edits the conference call (changes or cancels the schedule), the server controller 122 sends a message about the edited conference call to each participant.

The server controller 122 provides the conference call connection information to every participant including the host, so that an absent participant of the conference call can join in the conference call in person and a participant disconnected from the conference call in an unintended situation can directly participate in the conference call using the connection information.

When receiving the conference call participant ID from the host, the reservation manager 124 of the conference server 120 obtains and provides the schedule information of the conference call participants to the host, registers the conference call reservation information received from the host, and provides the conference call reservation information to each participant under control of the server controller 122.

The reservation manager 124 determines whether a conference call is to be conducted by analyzing the pre-registered conference call reservation information.

The reservation manager 124 generates the conference call reservation information by receiving the schedule information of the conference call participants and host. The reservation manager 124 determines the available conference call schedule by receiving the schedules of the participants and the host and provides the schedule to the participants and the host. The conference call reservation information may be generated by the portable terminal or the conference server.

The communication unit 126 sends and receives information to reserve the conference call by communicating with the portable terminal 100. The information to reserve the conference call includes the conference call participant information, the participant schedule information, and the conference call reservation information.

The server controller 122 and the reservation manager 124 of the conference server 120 may be operated by a program which is a set of instructions.

Figure 2:
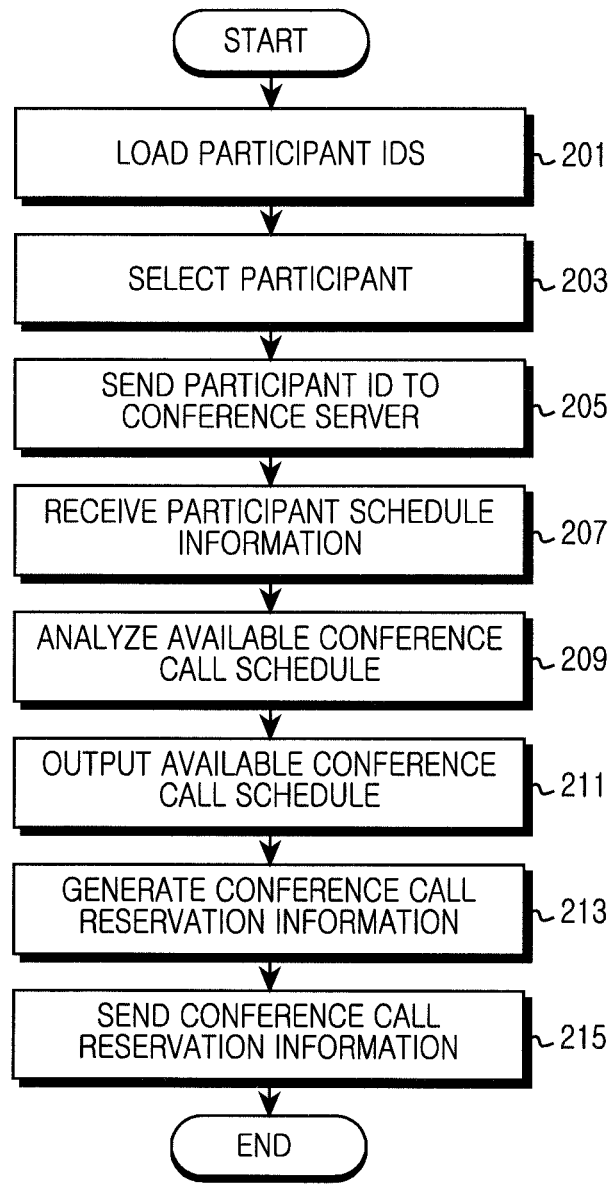
FIG. 2 is a flowchart of a method for reserving a conference call in a portable terminal according to an exemplary embodiment of the present invention.

FIG. 2 is a flowchart of a method for reserving a conference call in the portable terminal according to an exemplary embodiment of the present invention.

Referring to FIG. 2, the portable terminal indicates a portable terminal of the host who reserves the conference call. The portable terminal for reserving the conference call loads the participant IDs in step 201 and selects the participant which is the member of the conference call, based on the loaded IDs in step 203.

In so doing, the user of the portable terminal selects the user corresponding to, for example, phone book information registered in the portable terminal, the recent call list, the user's phone number registered to the bookmark, the incoming/ outgoing message information, the user's e-mail information, the user ID, and the account. The portable terminal may receive the ID information by accessing the web or the cloud system and then select the participant for the conference call.

The portable terminal sends the ID information of the selected participant to the conference server which conducts the conference call in step 205, and in step 207 receives the schedule information of the participant previously selected in step 203. The conference server receiving the participant ID Information requests and receives the schedule information from the participants, and forwards the schedule information to the portable terminal.

The portable terminal may communicate directly with the terminal of the participant and receive the schedule information of the participant using a Peer-to-Peer (P2P) scheme, instead of the conference server. The conference server is mentioned as the element for interconnecting the participant and the host; an application installed in the portable terminal may also act as the conference server.

The portable terminal analyzes the available conference call schedule by analyzing the received participant schedule information in step 209, and controls to output the available conference call schedule in step 211.

In so doing, the portable terminal can receive the available conference call date and time from the participants and then analyze the conference call schedule available to all of the participants. The portable terminal may receive dates and times of other schedules from the participants and then analyze the conference call schedule available to all of the participants.

In step 213, the portable terminal receives the selected date and time for the conference call from the user and generates the conference call reservation information including the selected date and time. The conference call reservation information indicates information about the date and the time for the host of the conference call.

The portable terminal sends the conference call reservation information to the conference server in step 215 and then finishes this process.

While the portable terminal reserves the conference call using the schedule information of the participants, the portable terminal may conduct the conference call using user identification information regardless of the participants' schedules. The portable terminal immediately conducts the conference call using information representing the user, with steps 207, 209 and 211 omitted in FIG. 2, as described below with respect to FIG. 12.

Figure 3:
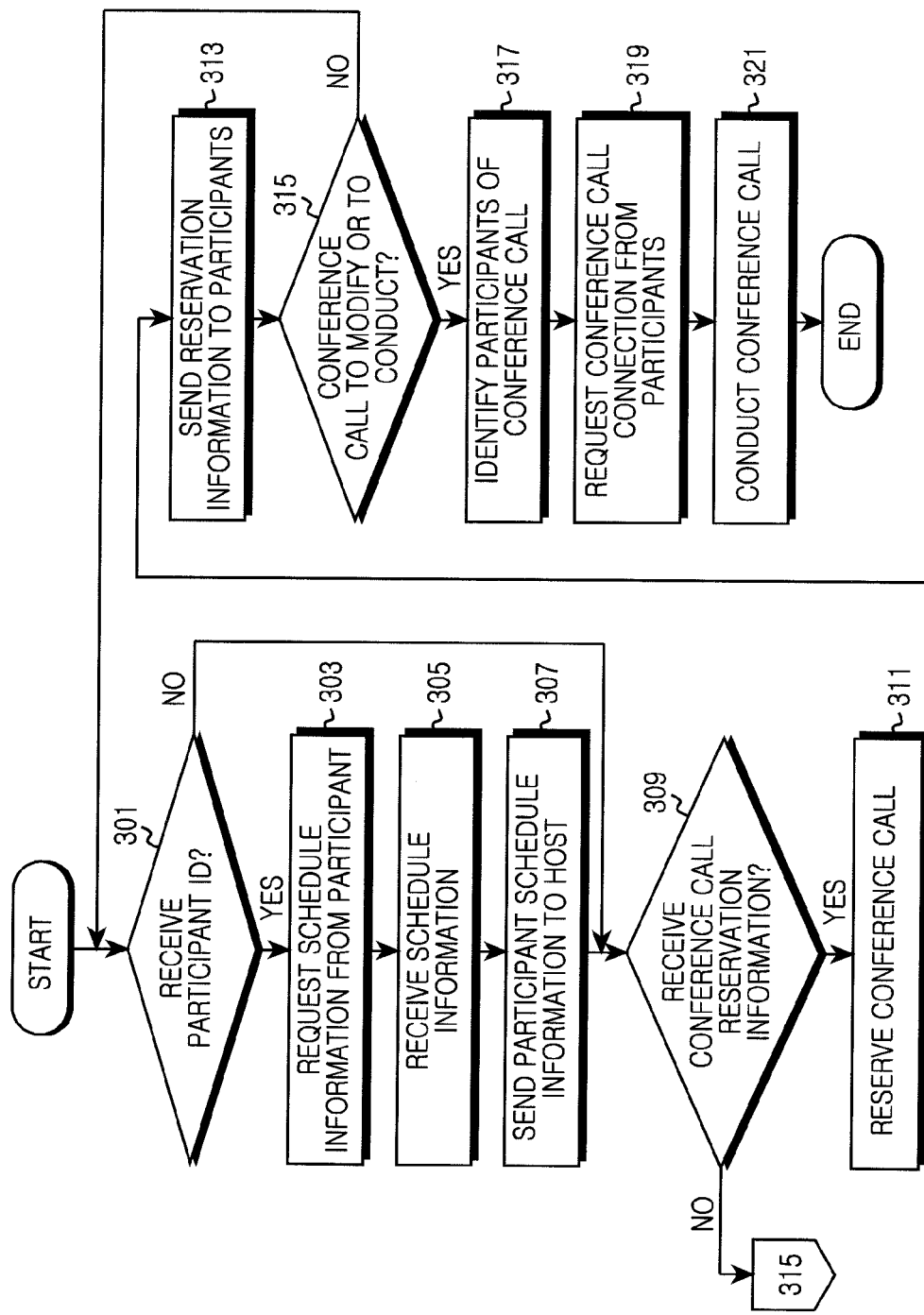
FIG. 3 is a flowchart of a method for reserving a conference call in a conference server according to an exemplary embodiment of the present invention.

FIG. 3 is a flowchart of a method for reserving a conference call in the conference server according to an exemplary embodiment of the present invention.

Referring to FIG. 3, the conference server determines whether the participant ID is received from the portable terminal of the host in step 301. The participant ID indicates the conference call member information selected by the user who hosts the conference call.

When the conference server receives the participant ID from the portable terminal of the host in step 301, the conference server requests the schedule information from the participant in step 303 and receives the participant's schedule information in response to the request in step 305.

In step 307, the conference server forwards the schedule information received from the participant, to the user who hosts the conference call. Accordingly, the terminal of the user hosting the conference call may check the available conference call schedule using the participant schedule information. In step 309, the conference server determines whether the conference call reservation information including conference call scheduled date and time information from the portable terminal of the host.

When the conference server does not receive the participant ID from the host portable terminal in step 301, the conference server determines whether the conference call reservation information is received from the host portable terminal in step 309.

Upon receiving the conference call reservation information from the host portable terminal in step 309, the conference server reserves (registers) the host's conference call using the conference call reservation information in step 311 and then sends the conference call reservation information to each participant in step 313.

In step 315, the conference server determines whether a conference call is to be conducted according to the pre-stored conference call reservation information. When the conference server does not receiving the conference call reservation information in step 309, the conference server may perform step 315.

In step 315, the conference server determines whether a conference call is to be conducted by comparing the current date and time with the pre-registered conference call reservation information.

When detecting no conference call to conduct in step 315, the conference server determines whether to reserve the conference call or to conduct the conference call for other host in step 301.

Upon detecting the conference call to conduct in step 315, the conference server identifies the participants of the conference call to conduct now in step 317, and then requests the conference call connection from the participants of the conference call in step 319. The conference server may call each user at the start point of the reserved conference call to join in the conference call.

The conference server conducts the conference call for the host and the participants in step 321 and then finishes this process.

The conference server is the component for interconnecting the participant and the host of the conference call, and its functions can be fulfilled by an application.

The conference server in FIG. 3 may generate the conference call reservation information by receiving the schedule information of the host and the participants and directly checking the available conference call schedule. Accordingly, the conference server may send its generated conference call reservation information directly to the host and the participants.

Figure 4:
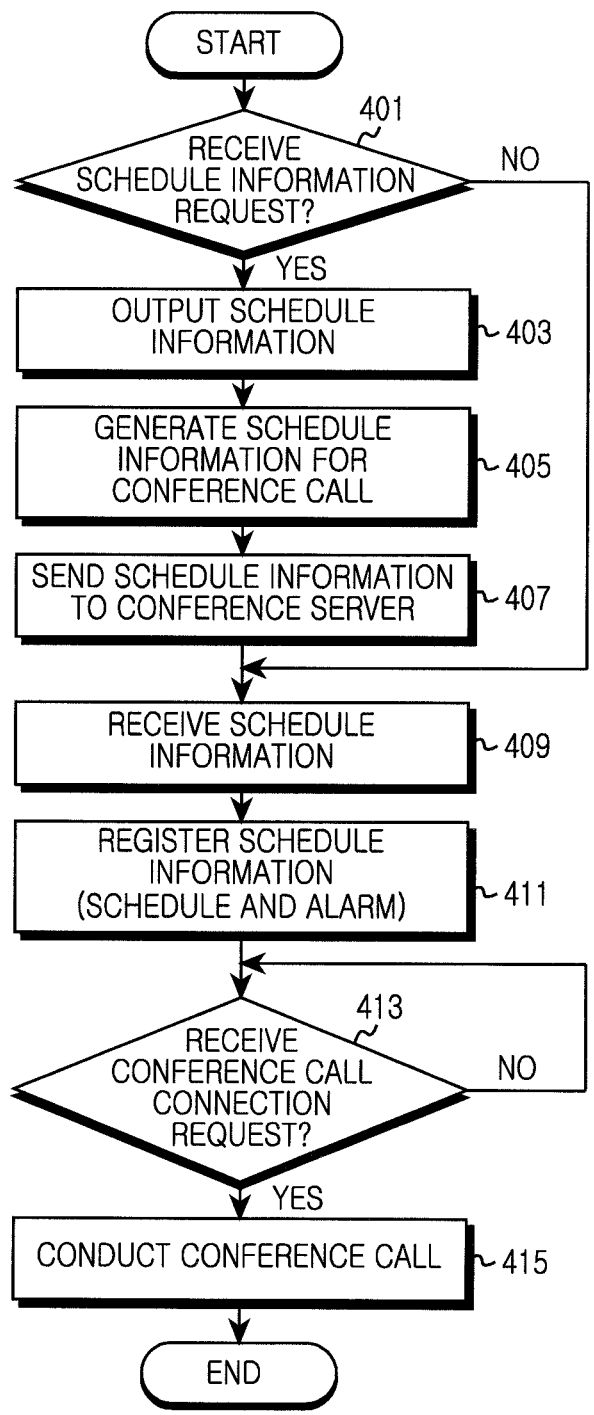
FIG. 4 is a flowchart of a method for registering reservation information of a conference call in a portable terminal according to an exemplary embodiment of the present invention.

FIG. 4 is a flowchart of a method for registering a conference call reservation information in a portable terminal according to an exemplary embodiment of the present invention.

Referring to FIG. 4, the portable terminal indicates a portable terminal of the participant of the conference call. The portable terminal for registering the conference call reservation information determines whether a schedule information request is received from the conference server in step 401.

Upon receiving the schedule information request in step 401, the portable terminal executes and outputs a schedule management function, such as schedule function or alarm function, in step 403, and generates schedule information about a schedulable day or a scheduled day in step 405.

To provide the information of the scheduled day, the portable terminal may process to mark the corresponding day scheduled, without revealing schedule details, so as to prevent leakage of private information.

The portable terminal sends the generated schedule information to the conference server in step 407 and receives the conference call reservation information set by the host from the conference server in step 409.

The portable terminal controls to register and manage the received conference call reservation information in the schedule management function (its schedule function or alarm function) in step 411, and determines whether the conference call connection request is received from the conference server in step 413.

The conference call connection request indicates that the conference server, confirms the registered conference call reservation information, and tries to connect the call or send a message to each participant at the start of the conference call in order to participate in the conference call.

When the portable terminal does not receive the conference call connection request from the conference server in step 413, the portable terminal waits until the conference call connection request is received and then proceeds to step 413.

Upon receiving the conference call connection request from the conference server in step 413, the portable terminal sends an approval message for the received conference call connection request and conducts the conference call in step 415.

When the portable terminal does not receive a schedule information request in step 401, the portable terminal may receive the conference call reservation information set by the host from the conference server in step 409. In this case, the conference call reservation information reserved by the host may be received regardless of the schedule information of the portable terminal.

Next, the portable terminal finishes this process.

Figure 5:
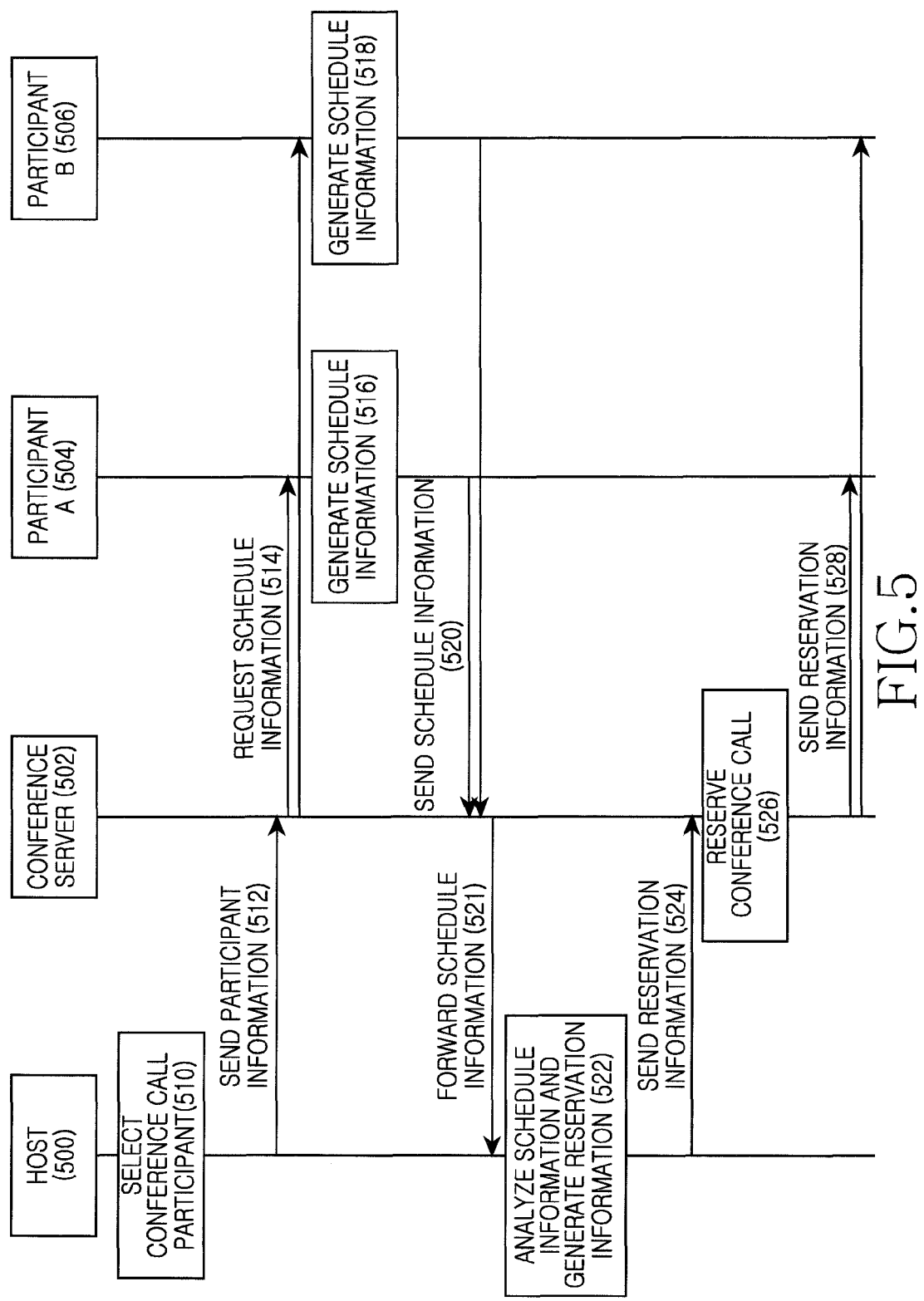
FIG. 5 depicts a conference call reservation in a mobile communication system according to an exemplary embodiment of the present invention.

FIG. 5 depicts a conference call reservation in a mobile communication system according to an exemplary embodiment of the present invention.

Referring to FIG. 5, the mobile communication system may include a terminal of a host 500, a conference server 502, a terminal of a participant A 504, and a terminal of a participant B 506.

The host terminal 500 selects the participants A 504 and B 506 to participate in the conference call using the participant IDs in step 510, and sends the selected participant information (ID information) to the conference server 502 in step 512.

The conference server 502 may identify the participants of the conference call and requests the schedule information from the participants A 504 and B 506 in step 514. This is to generate the conference call reservation information including the schedule for the conference call. The conference call reservation information may be generated by the host terminal or the conference server. Hereafter, the host terminal generates the conference call reservation information.

Accordingly, the participants receiving the schedule information request check their schedule, generate the schedule information about the schedulable day or the scheduled day in steps 516 and 518, and send the schedule information to the conference server 502 in step 520.

The conference server 502 receives the schedule information of each participant and controls to forward the schedule information to the host 500 in step 521.

The host 500 receiving the schedule information of each individual participant schedules the conference call by analyzing the received schedule information, and generates the conference call reservation information by selecting the date allowing all of the participants to take part in the conference call in step 522.

The host 500 sends the generated conference call reservation information to the conference server 502 in step 524, so that the conference server 502 reserves the conference call in step 526. The conference server 502 sends the conference call reservation information to the participants in step 528, to confirm the information on conference call date selected by the host 500.

When the host 500 cancels the conference call reservation and sends a reservation cancel request to the conference server 502, the conference server 502 deletes the conference call reservation corresponding to the cancel request and notifies the cancelled conference call reservation to the participants 504 and 506 corresponding to the reserved conference call.

Figure 6:
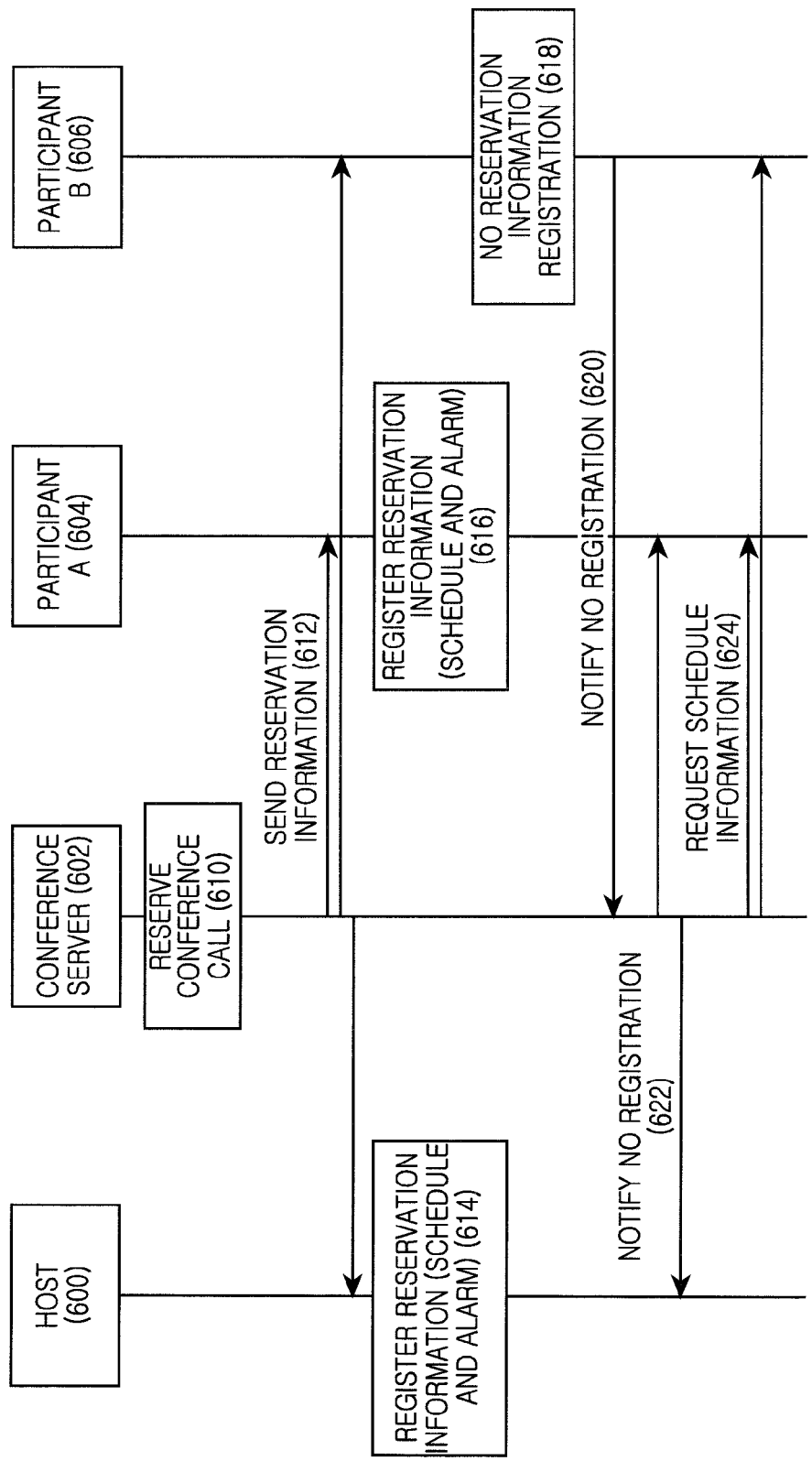
FIG. 6 depicts change of a conference call reservation information in a mobile communication system according to an exemplary embodiment of the present invention.

FIG. 6 depicts a change of conference call reservation information in a mobile communication system according to an exemplary embodiment of the present invention.

Referring to FIG. 6, the mobile communication system may include a terminal of a host 600, a conference server 602, a terminal of a participant A 604, and a terminal of a participant B 606.

The conference server 602 reserves the conference call in step 610 using the conference call reservation information received from the host 600 and sends the conference call reservation information to the participants A 604 and B 606 in step 612, so as to confirm the information at the conference call date selected by the host 600.

Accordingly, the terminals of the participants may register the conference call schedule selected by the host using the schedule function. The terminals of the participants may also register the conference call schedule selected by the host using the alarm function. The host 600 and the participant terminal A 604 may register the conference call reservation information (e.g., the conference call schedule selected by the host) in steps 614 and 616.

When the participant terminal B 606 cannot register the conference call schedule selected by the host in step 618, the participant terminal B 606 sends a message informing of the conference call schedule registration failure to the conference server 602 in step 620. The conference server 602 receiving the schedule registration failure message notifies each participant of the presence of the participant who fails to register the conference call schedule in step 622. The conference server 602 may send a message informing of the schedule registration failure to the host of the conference call and the participant selected by the host.

The conference server 602 requests and receives the schedule information from each participant in step 624 and sends the information to the host 600 so that the host 600 can re-register the conference call reservation.

When the conference server 602 notifies each participant of the conference call reservation cancellation, the host terminal 600 and the participant terminals 604 and 606 may delete the conference call schedule registered to the schedule function or the alarm function.

Figure 7:
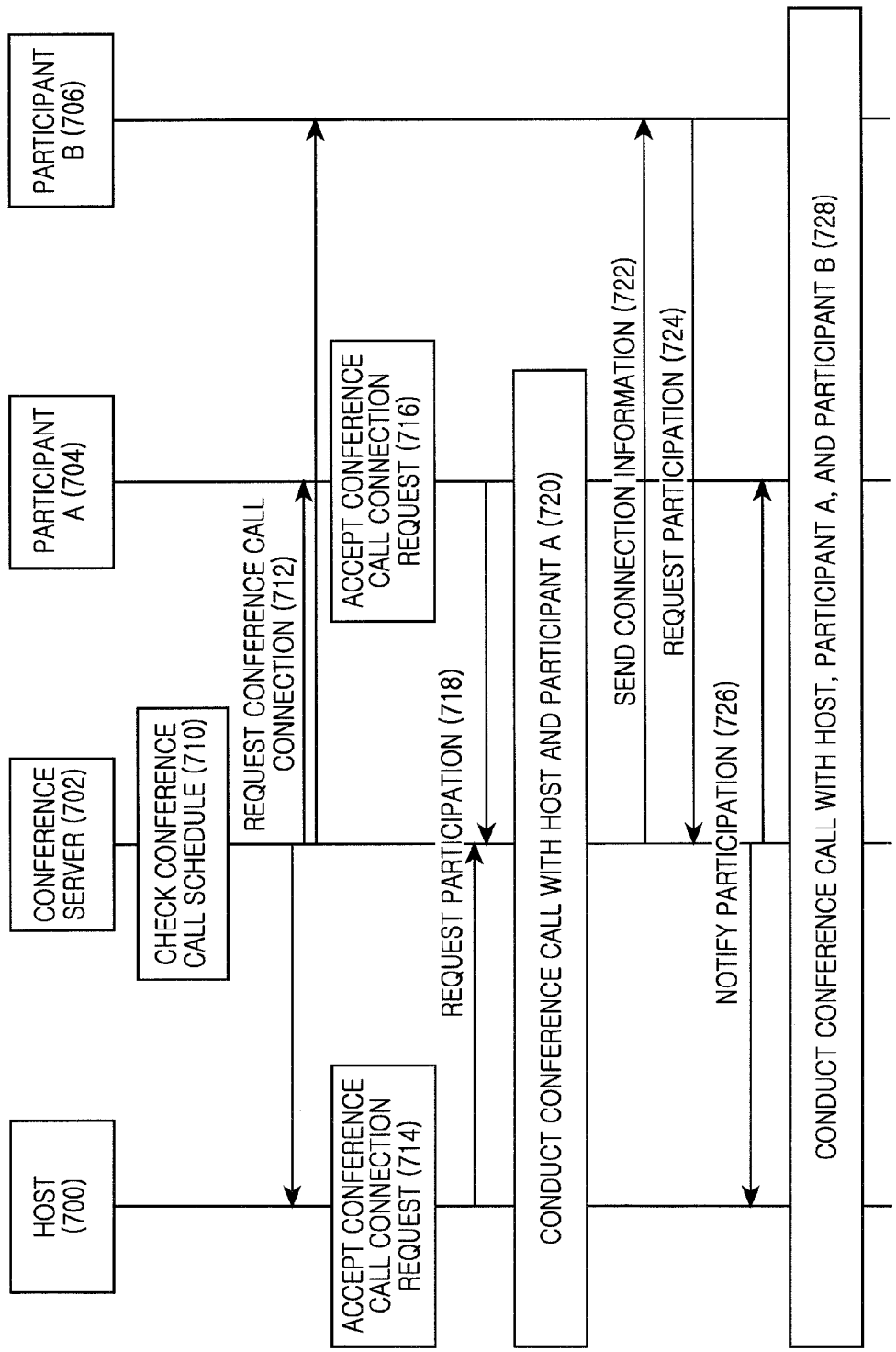
FIG. 7 depicts conference call execution in a mobile communication system according to an exemplary embodiment of the present invention.

FIG. 7 depicts conference call execution in a mobile communication system according to an exemplary embodiment of the present invention.

Referring to FIG. 7, the mobile communication system can include a terminal of a host 700, a conference server 702, a terminal of a participant A 704, and a terminal of a participant B 706.

The host 700 has previously reserved the conference call in the conference server 702. The conference server 702 checks the conference call schedule and determines whether there is a conference call to conduct by comparing the current date and time with the pre-registered conference call reservation information in step 710.

When the conference server 702 detects a conference call to conduct, the conference server 702 requests the conference call connection to the host 700 and the participant terminals 704 and 706 in step 712.

The conference call connection request may be the call connection to the participant terminals including the host so as to induce their conference call participation. The conference call connection request may also be a message (e.g., a short message or an instant message) transmission to the participant terminals including the host so as to induce their conference call participation. The terminals of the host and the participants can participate in the conference call by accepting the conference call connection request.

Then the host 700 and the participant A 704 accept the conference call connection request in steps 714 and 716, the two terminals send a conference call participation request message to the conference server 702 in step 718. The host 700 and the participant A 704 conduct the conference call in step 720.

When the participant B 706 does not accept the conference call connection request, the conference server 702 does not receive the conference call participation request message from the participant B 706. Accordingly, the conference server 702 sends the conference call connection information to the participant B 706 not approving the conference call in step 722. The conference call connection information may be information including a method allowing the user not attending the current conference call to join in the conference call later.

To join in the conference call, the participant B 706 sends a participation request to the conference server 702 using the conference call connection information in step 724. The conference server 702 receiving the participation request notifies the user attending the current conference call that the participant B 706 wants to join in step 726. The information of a new user is provided to the participant of the conference call. The conference server 702 need not notify the information to the participant.

The conference server 702 conducts the conference call with the host 700, the participant A 704, and the participant B 706 in step 728.

Figure 8B:
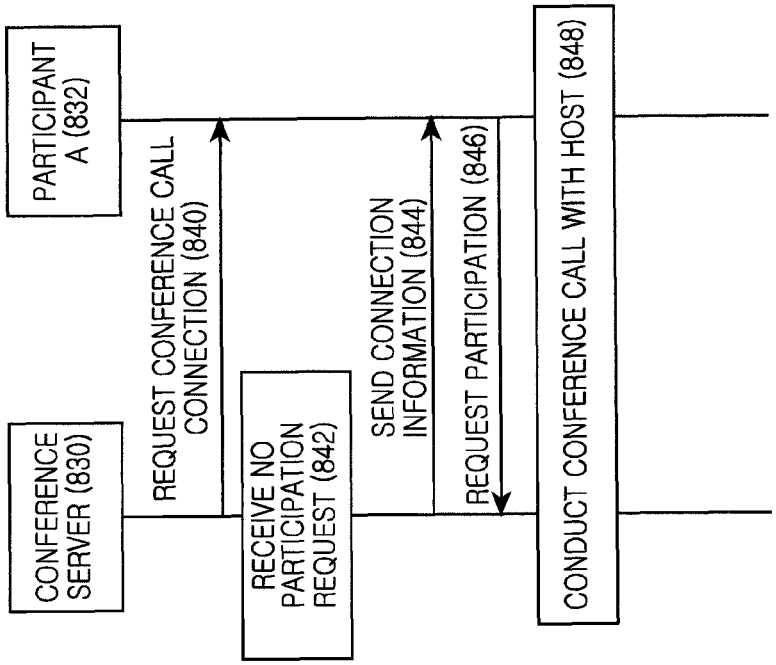
FIGS. 8A and 8B depict conference call execution in a mobile communication system according to another exemplary embodiment of the present invention.
Figure 8A:
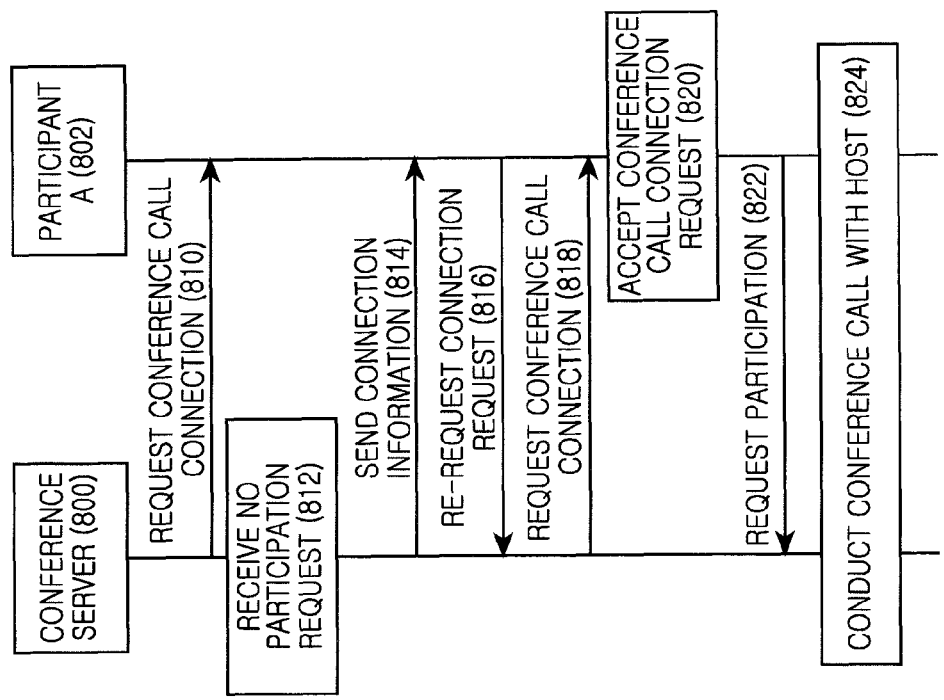

FIGS. 8A and 8B depict conference call execution in a mobile communication system according to another exemplary embodiment of the present invention.

Referring to FIGS. 8A and 8B, the mobile communication system includes a conference server and a terminal of a participant A. In the example shown in FIGS. 8A and 8B, a terminal not joining when the conference server sends the connection request participates in the conference call later.

Referring to FIG. 8A, the conference server 800 sends the conference call connection request to the participant A 802 in step 810, and determines whether the participation request is received from the participant A 802.

When the conference server 800 does not receive the participation request from the participant A 802 in step 812, the conference server 800 sends the connection information to the participant A 802 which does not send the participation request in step 814. The participant A 802 can join in the conference call using the connection information when the participant A 802 is available. For example, the participant A 802 may re-request the connection request by sending a short message or an instant message to the conference server 800 in step 816.

The conference server 800 receiving the connection request requests the conference call connection by trying the call connection to the terminal of the participant A 802 to induce the conference call participation in step 818. The participant A 802 accepts the conference call connection request by receiving the call connection for the conference call participation in step 820, and sends the participation request to the conference server 800 in step 822. Accordingly, the conference server 800 conducts the conference call with the host and the participant A 802 in step 824.

Referring to FIG. 8B, the conference server 830 sends the conference call connection request to the participant A 832 in step 840, and determines whether the participation request is received from the participant A 832.

When the conference server 830 does not receive the participation request from the participant A 832 in step 842, the conference server 830 sends the connection information to the participant A 832 which does not send the participation request in step 844. The participant A 832 can join in the conference call using the connection information when the participant A becomes available.

For example, the participant A 832 may join in the conference call by directly connecting the call using the conference call connection information of the connection information in step 846. Accordingly, the conference server 830 conducts the conference call with the host and the participant A 832 in step 848.

Figure 9:
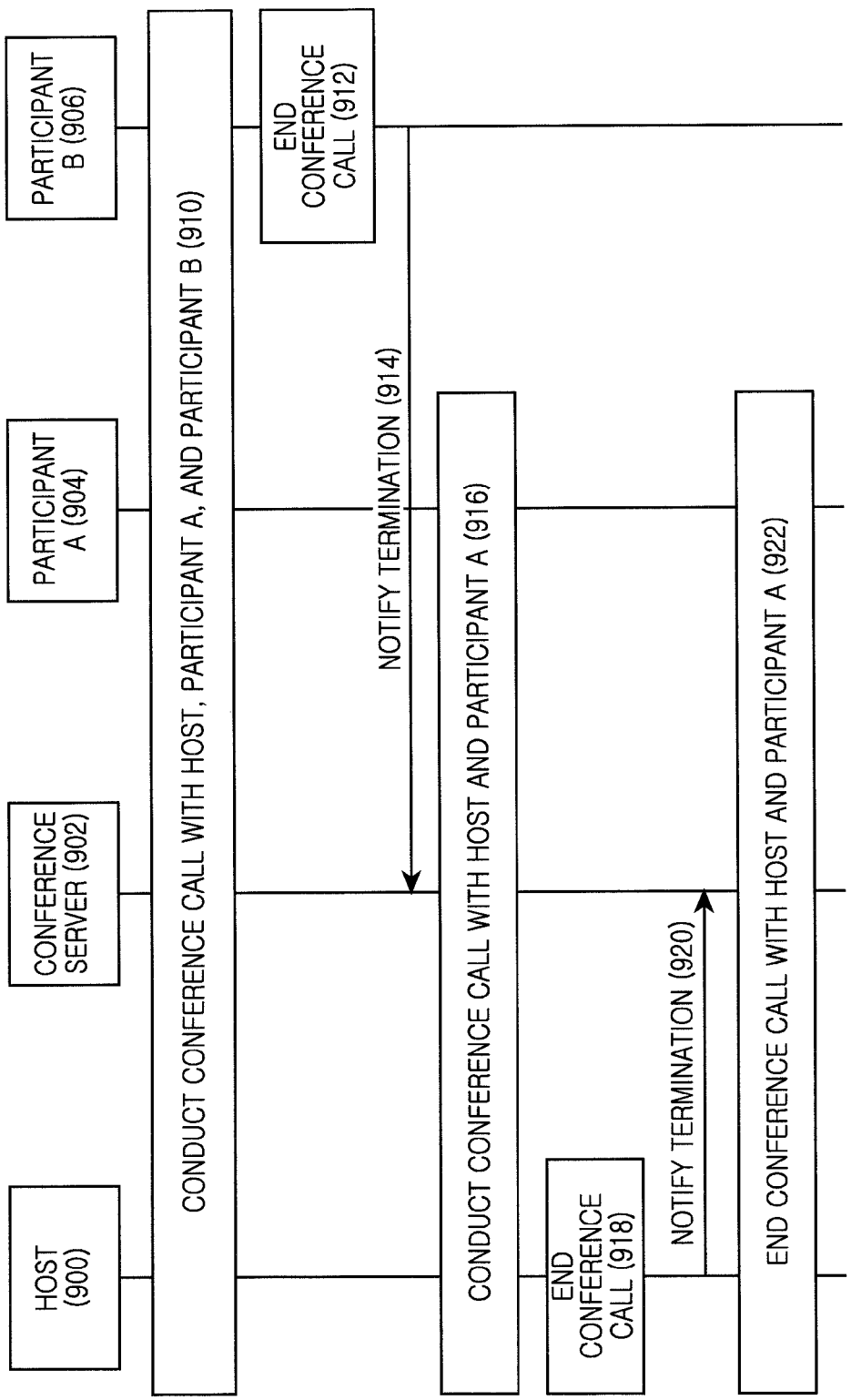
FIG. 9 depicts conference call participation termination in a mobile communication system according to an exemplary embodiment of the present invention.

FIG. 9 depicts conference call participation termination in a mobile communication system according to an exemplary embodiment of the present invention.

Referring to FIG. 9, the mobile communication system may include a terminal of a host 900, a conference server 902, a terminal of a participant A 904, and a terminal of a participant B 906.

The conference server 902 conducts the conference call with the host 900, the participant A 904, and the participant B 906 in step 910. When the participant B 906 terminates the conference call during the conference call in step 912, the terminal of the participant B 906 notifies the conference call termination to the conference server 902 in step 914. The conference server 902 continues to conduct the conference call with the host 900 and the participant A 904 in step 916.

When the host 900 of the conference call terminates the conference call in step 918, the host terminal 900 notifies the conference call termination to the conference server 902 in step 920. The conference server 902 processes to end the conference call with the host 900 and the participant A 904 in step 922.

Figure 10:
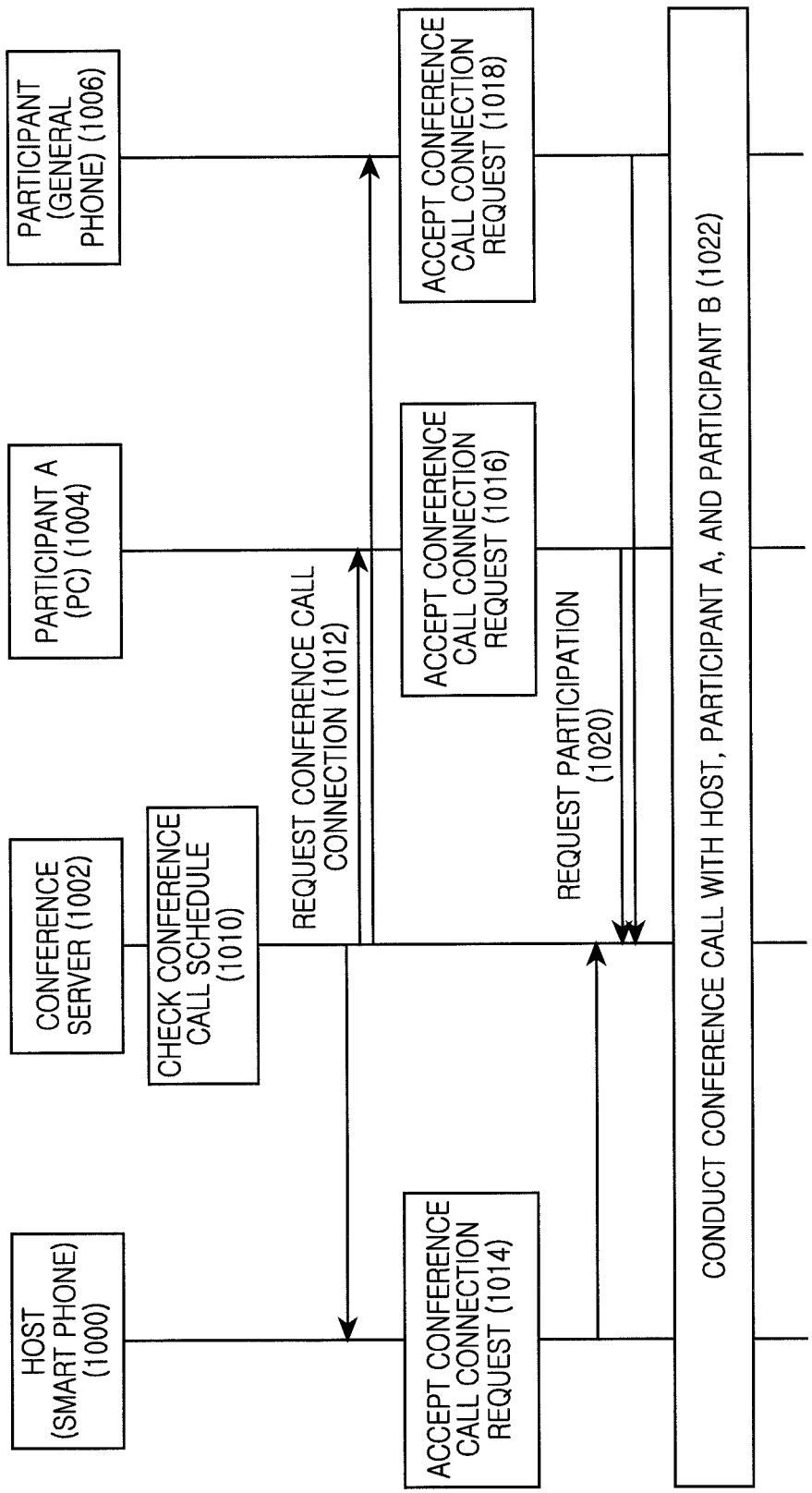
FIG. 10 depicts a conference call in a mobile communication system according to another exemplary embodiment of the present invention.

FIG. 10 depicts a conference call in a mobile communication system according to another exemplary embodiment of the present invention.

Referring to FIG. 10, the mobile communication system may include a smart phone of a host 1000, a conference server 1002, a Personal Computer (PC) of a participant A 1004, and a general phone of a participant B 1006.

The smart phone of the host 1000 reserves the conference call with the conference server 1002. The conference server 1002 checks the conference call schedule and determines whether there is a conference call to conduct by comparing the current date and time with the pre-registered conference call reservation information in step 1010.

When the conference server 1002 determines that there is a conference call to conduct, the conference server 1002 requests the conference call connection to the smart phone of host 1000, the PC of the participant A 1004, and the general phone of the participant B 1006 in step 1012.

The conference server 1002 can identify a network type supported by the host and participant terminals and then request the conference call connection using a message for each terminal. For example, the conference server 1002 may request the conference call connection from the smart phone of the host 1000 using a short message, and request the conference call connection from the PC of the participant A 1004 using an instant message. The conference server 1002 may request the conference call connection from the general phone of participant B 1006 using the call connection.

The host and participant terminals may participate in the conference call by accepting the conference call connection request. When the host 1000, the participant A 1004, and the participant B 1006 accept the conference call connection request in steps 1014, 1016, and 1018, each terminal sends the conference call participation request message to the conference server 1002 in step 1020. The host 1000, the participant A 1004, and the participant B 1006 conduct the conference call in step 1022.

Figure 11:
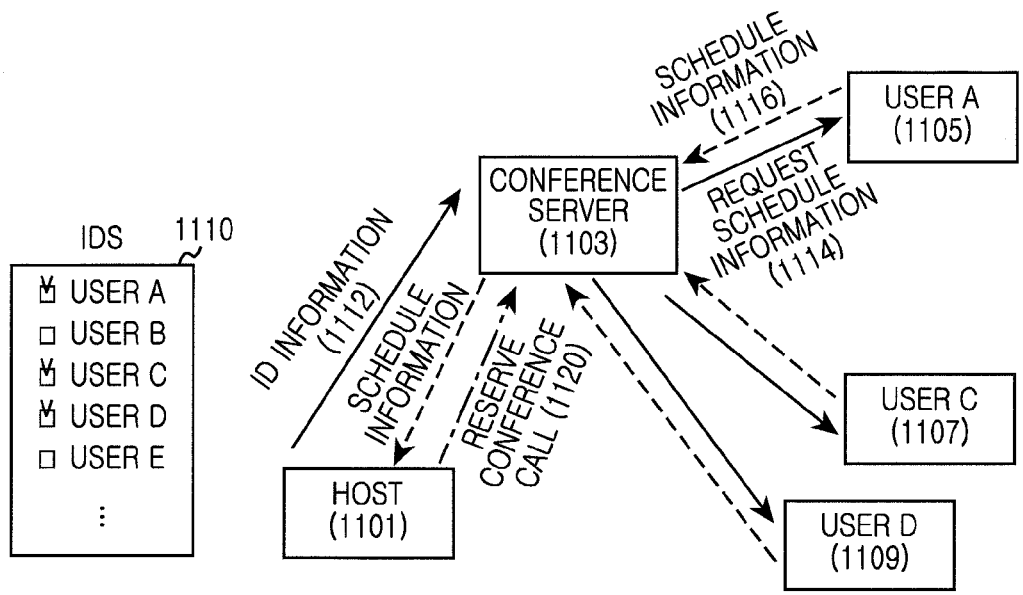
FIG. 11 is depicts a mobile communication system for reserving a conference call according to an exemplary embodiment of the present invention.

FIG. 11 depicts a mobile communication system for reserving a conference call according to an exemplary embodiment of the present invention.

Referring to FIG. 11, the mobile communication system may include a host terminal 1101, a conference server 1103, and participant terminals 1105, 1107 and 1109 of the conference call.

The host, who is the user hosting the conference call, selects the conference call members using the participant IDs stored in the terminal, the web, and/or the cloud system and sends the participant IDs of the selected members to the conference server. Among users A through E in FIG. 11, the host terminal 1101 selects the users A, C, and D from the registered IDs 1110, classifies the users A, C, and D as the conference call members, and sends member information to the conference server 1103 in step 1112.

The conference server 1103 requests the schedule information from the terminals of the participants A, C, and D in step 1114, receives the schedule information from the participant terminals in step 1116, and forwards the schedule information to the host terminal 1101.

The host terminal 1101 receiving the participant schedule information checks the schedule available for the conference call by analyzing the received schedule information. The schedule available for the conference call may allow all of the participants to join in the conference call at the same time. The schedule may also allow the conference call with a maximum number of users.

The host terminal 1101 outputs the available schedule for all of the users by checking the available conference call schedules of the participants A, C, and D in step 1118, and then reserves the conference call by sending the schedule selected by the user to the conference server 1103 in step 1120. According to the output schedule analysis, the participants A, C, and D can attend the conference call from 10 a.m. to 11 a.m. and only the participant C can attend the conference from 11 to 12. The participant A alone can attend the conference call from 12 to 13. The host can select 10 to 11 as the conference call schedule for all of the participants A, C, and D. When the participant and the host are placed in different countries as shown in FIG. 11, the host terminal 1101 can provide local times such as GMT and summer time per country.

While the host terminal 1101 schedules the conference call by analyzing the schedule information of the participants in FIG. 11, the conference server 1103 may schedule the conference call. The conference server 1103 may receive the schedule information of the host and the participants, schedule the conference call by analyzing the schedule information, and send the schedule to the host and the participants.

FIGS. 12A-12E depict a portable terminal for conducting a conference call according to an exemplary embodiment of the present invention.

Referring to FIGS. 12A-12E, a portable terminal may output a conference call menu for detecting the user's input to reserve the conference call.

For example, the portable terminal may output a dial screen 1200 including the conference call menu 1202 as shown in FIG. 12A. The dial screen 1200, which is a screen for trying the call connection by inputting a phone number of the called party, may provide a recent call history with a call button and try the call connection through the dial input. The conference call menu 1202 of the dial screen 1200 may output a screen for selecting the participant of the conference call.

The portable terminal may output the screen for selecting the conference call participants based on its pre-stored contact information as shown in FIG. 12B. The portable terminal may output the screen for selecting the conference call participants based on a group classified by the user as shown in FIG. 12C. FIG. 12C depicts a screen outputting the information of the conference call members classified and grouped. The screen for selecting the conference call participants may include checkboxes 1204 for selecting the users.

Accordingly, the portable terminal can set the user of the detected user input to the conference call participant, and display the user being the conference call participant using the checkbox. The portable terminal may mark the users that are conference call participants by activating the checkboxes 1206 of the conference call participant as shown in FIG. 12D.

When the portable terminal detects the user input in a conference call menu 1208 with the conference call participants selected as shown in FIG. 12E, the portable terminal processes to conduct the conference call.

The conference call execution may reserve the conference call by registering the participant information selected by the user to the conference server. In addition, the conference call execution may send the participant information selected by the user to the conference server so that the conference server may request the conference call participation from every participant.

In the conference call execution, the portable terminal of the host may provide the participant information to the conference server by accessing the conference server, and the conference server may request the conference call participation from the participants excluding the host.

Figure 13:
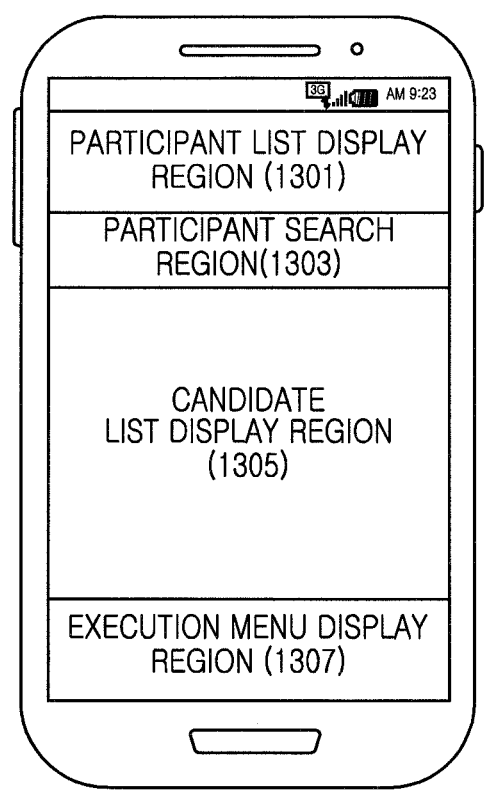
FIG. 13 depicts a portable terminal which executes a conference call function according to an exemplary embodiment of the present invention.

FIG. 13 depicts a screen of a portable terminal which executes a conference call function according to an exemplary embodiment of the present invention.

Referring to FIG. 13, when the user executes the conference call function, the portable terminal displays the screen of FIG. 13. A main screen of the conference call function of FIG. 13 may include a region 1301 for displaying a candidate list of the conference call, a region 1303 for searching for the conference call participant, a region 1305 for displaying the list of the participants selected as the conference call members, and a region 1307 for displaying an execution menu of the conference call.

The region 1301 for displaying the candidate list displays the list of the candidates for the conference call member. The candidate list indicates the pre-stored contact information (phone book information, recent call list, user's phone number registered to the bookmark, incoming/outgoing message information, user's e-mail information, user ID, account, and user information in the recent conference record), and the information registered to the network database (groupware, cloud system, and web address book).

The region 1303 for searching for the conference call participant provides an interface to search for a particular user (a user to join in the conference call) in the candidate list. The user of the portable terminal can search for a participant to take part in the conference call by inputting information (name or phone number) for identifying the user in the region 1303.

The region 1305 for displaying the list of the selected participants displays the information of the participants selected by the user of the portable terminal. For example, when at least one conference call participant is selected in the displayed candidate list, the selected participant information is added to the region 1305 for displaying the list of the selected participants. Similarly, when the searched participant is selected as the conference call participant, the selected participant information may be added to the region 1305 for displaying the list of the selected participants. When the host selects the participant, the host information may be also added to the region 1305 for displaying the list of the selected participants.

The participant information added to the region is represented as an icon, and participants already selected can be excluded from the conference call. When the participant information displayed in the region 1305 is selected, the selected participant information disappears from the region 1305, which signifies that the corresponding user is excluded from the conference call.

If necessary, the participant information added to the region 1301 may display detailed information of the corresponding participant. When the participant information displayed in the region 1301 is selected, the phone book of the selected participant can be linked.

The portable terminal may add the participant selected when the user (host) selects the participants, to the region 1305. This registers the participant faster and more easily than a terminal according to the related art which should issue an instruction finally to arrange the participants after selecting the participant.

The region 1307 for displaying the execution menu of the conference call includes a menu for immediately conducting the conference call with the selected participant, a menu for conducting the conference call with the selected participant on a preset date, and a menu for managing (e.g., requesting) the conference call history. The management of the conference call history may display not only the reserved conference call list but also a completed/canceled conference call list.

FIGS. 14A-14C depict screens of a portable terminal which conducts a conference call according to an exemplary embodiment of the present invention.

Referring to FIGS. 14A-14C, the portable terminal executes the conference call function and concurrently displays the main screen of FIG. 14A. The main screen displays the information for selecting the participant. The portable terminal includes the participant selected by the user to the participant list right away to add the participant of the conference call. The user of the portable terminal is automatically added to the participant list.

FIG. 14A depicts the screen displaying the information, such as phone book information, for selecting the participant while the host user of the portable terminal is included in the participant list. While a region 1400 displaying the list of the participants selected as the conference call members is allocated in the displayed screen, the screen does not display information notifying that the allocated region provides the list of the selected participants and information of the user selected as the participant. In this case, there is no participant selected by the current host. The portable terminal may display the information notifying that the allocated region provides the participant list before the participant is selected. For example, the portable terminal may display a title "Participant list" to inform the user that the region displays the selected participant list.

When the user Andrew is selected as the participant 1401 in the screen, the selected Andrew is added to the participant list 1405 as shown in FIG. 14B. When at least one participant is selected, the portable terminal may display the information notifying that the selected participant list is provided in the region, and add the selected participant to the region providing the selected participant list.

When at least one participant is selected, the portable terminal may automatically add the user hosting the conference call into the region displaying the selected participant list. When the participant (e.g., Andrew) is added while not displaying the information notifying that the region provides the selected participant list as shown in FIG. 14A, the portable terminal adds and displays the host "Me" and the selected participant "Andrew" in the participant list as shown in FIG. 14B.

After registering the conference call participants, when a menu requesting to commence the conference call is input, the portable terminal conducts the conference call with the participants. The portable terminal conducts the conference call by detecting the input 1407 of a conference start menu with the host and the participant Andrew registered as shown in FIG. 14C. The conference call may be carried out immediately upon the registration of the participants.

The screens of FIGS. 14A-14C display a menu (conference start menu) for immediately executing the conference call with the selected participant, a menu (conference reservation menu) for conducting the conference call with the selected participant on a preset date, a menu (my conference menu) for managing the conference call history, and a menu (number change menu) for changing the phone number to receive the conference call, as the execution menus of the conference call.

The menu for changing the phone number to receive the conference call changes the phone number of the host or the participant. This menu may be used to change the phone number of the terminal capable of receiving the call when the user's terminal can control (reserve or request) the conference call but cannot receive the call.

The candidate list may include a user who uses a plurality of terminals. For example, when the user is added with a home phone number set to the main phone number and an office phone number and a mobile phone number set to subsidiary phone numbers, the conference call is conducted with the main phone number by default, but the conference call may be set to use the subsidiary number via the appropriate menu.

Figure 15:
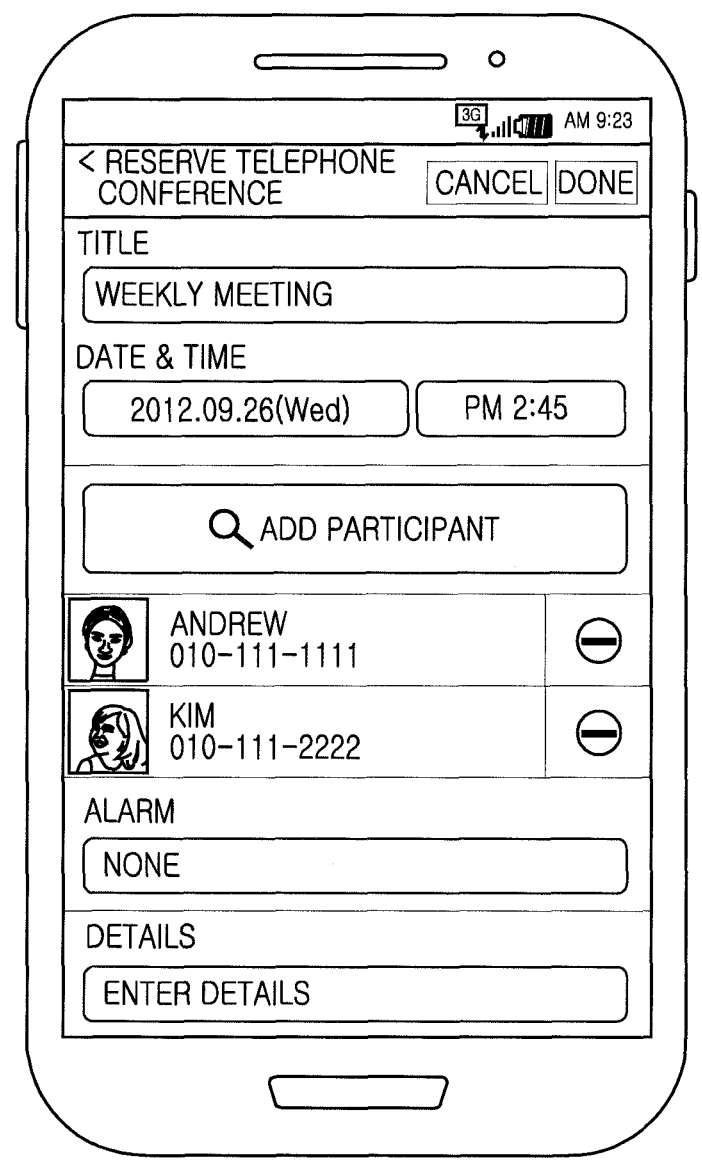
FIG. 15 depicts a screen of a portable terminal which conducts a conference call according to an exemplary embodiment of the present invention.

FIG. 15 depicts a screen of a portable terminal which conducts a conference call according to an exemplary embodiment of the present invention.

Figure 14:
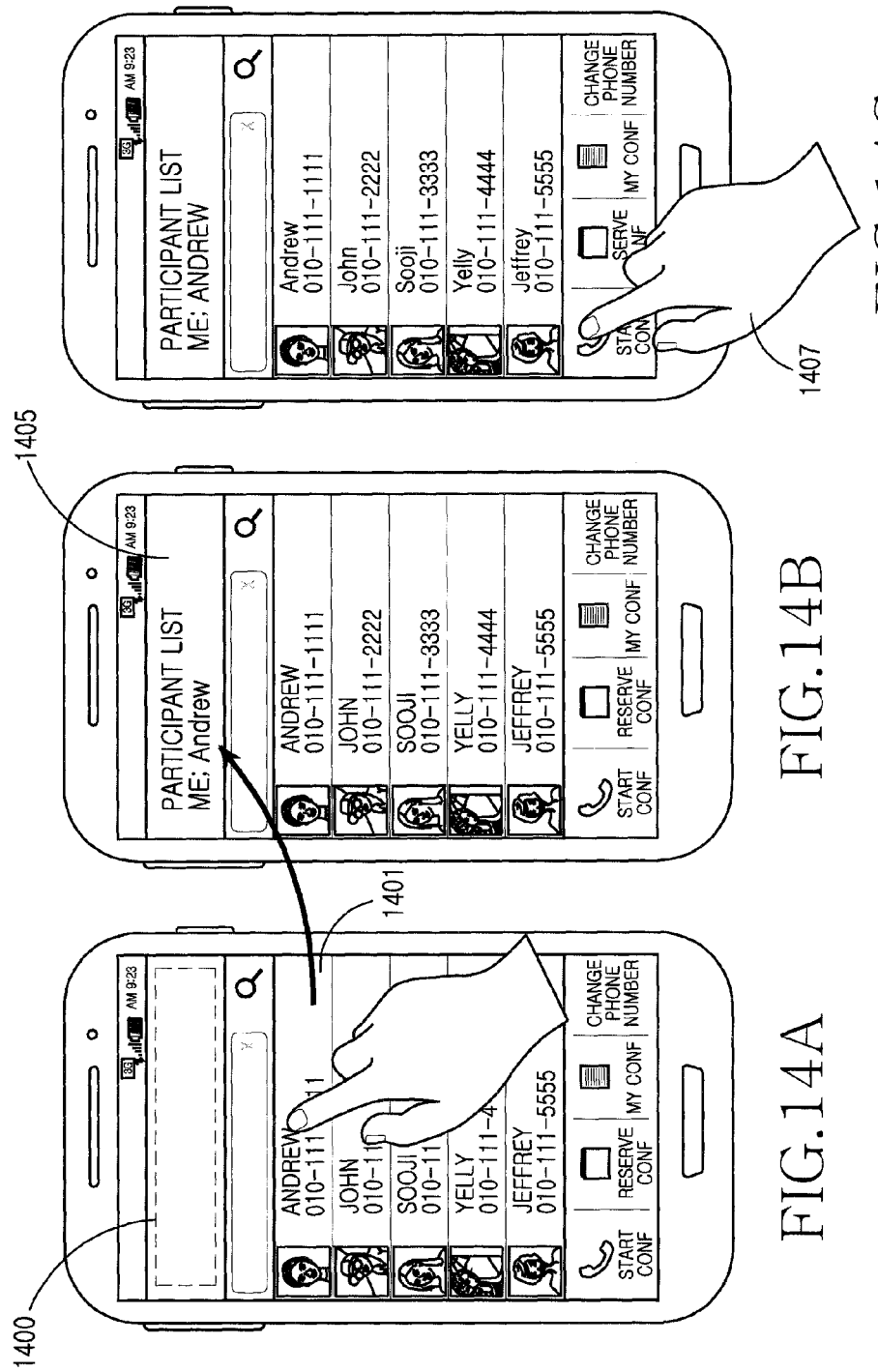
FIGS. 14A-14C depict screens of a portable terminal which conducts a conference call according to an exemplary embodiment of the present invention.

Referring to FIG. 15, it is assumed that the portable terminal currently selects the participants and reserves the conference call on a preset date (the reserved execution). In this case, the portable terminal may concurrently select and register the participants based on the information, such as phone book, allowing the portable terminal user to select the participant as shown in FIG. 14.

However, in the reserved execution, the conference call is to be conducted on the preset date, not immediately. In this case, the portable terminal registers the participants and also registers the conference call schedule. The portable terminal displays a conference call reservation screen including items for registering conference call title, date, and participants as shown in FIG. 15.

The user may select the title item of the conference call reservation screen and input the title of the conference call. The portable terminal may display a virtual keypad on the screen to input the title of the conference call.

The user may select the date item and input information about the date and the time of the conference call. The portable terminal may display the schedulable dates by analyzing the schedules of the participants as described above with respect to FIG. 2. Without analyzing the schedules of the participants, the portable terminal may display the screen for setting the date and the time so that the host can select his/her intended date and time.

The user may also register the participant of the conference call by selecting the item for registering the participant. The participant registration may include adding a new participant to the participant list and removing a registered participant from the participant list. When the user adds a new participant, the portable terminal may distinguish the pre-registered participant from the new participant by applying a particular effect to the new participant. For example, to distinguish the pre-registered participant and the new participant, the portable terminal may shade the pre-registered participant.

Such item information may be used to manage the conference call history. The item information may be displayed as summary information of not only the reserved conference call list but also the completed/canceled conference call list.

When detecting the user's input to reserve the conference call, the portable terminal sends the item input information to the conference server to reserve the conference call. The portable terminal may register the input information to the conference server so as to conduct the conference call on the preset date, which signifies that the conference server manages the conference call reservation. For example, the portable terminal may store the input information and then send the input information to the conference server on the preset date so as to conduct the conference call, which signifies that the portable terminal manages the conference call reservation.

Figure 16A:
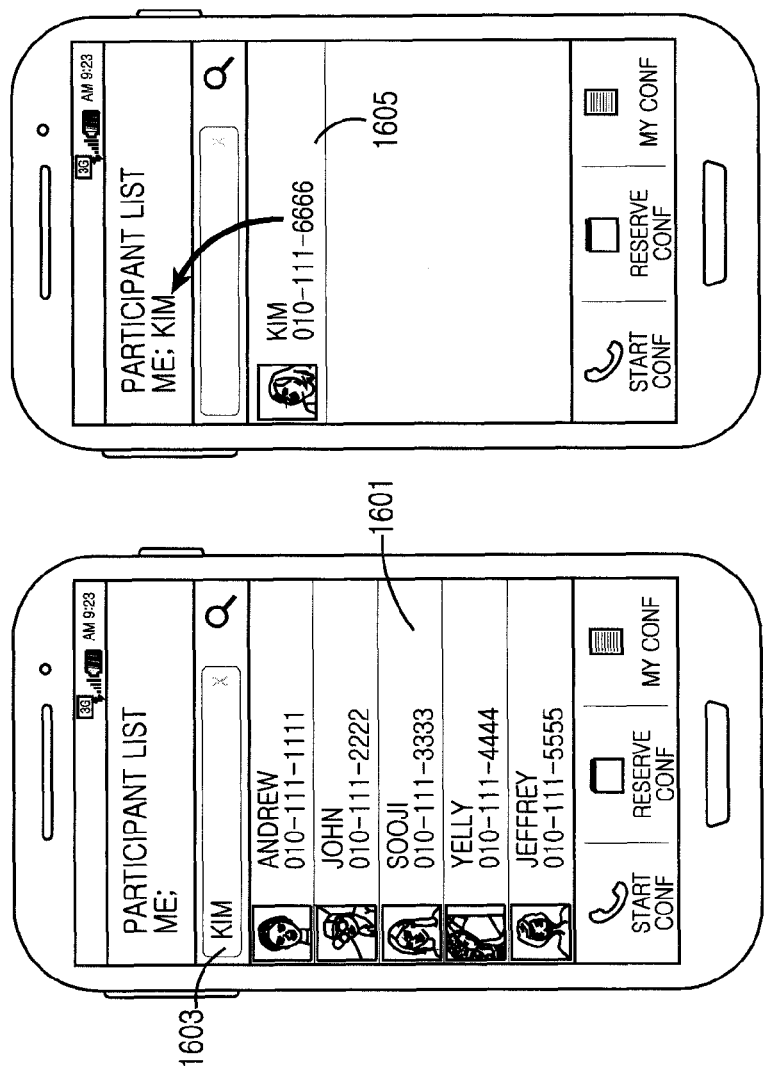
FIGS. 16A-16C depict screens of a portable terminal which registers a participant of a conference call according to an exemplary embodiment of the present invention.
Figure 16B:
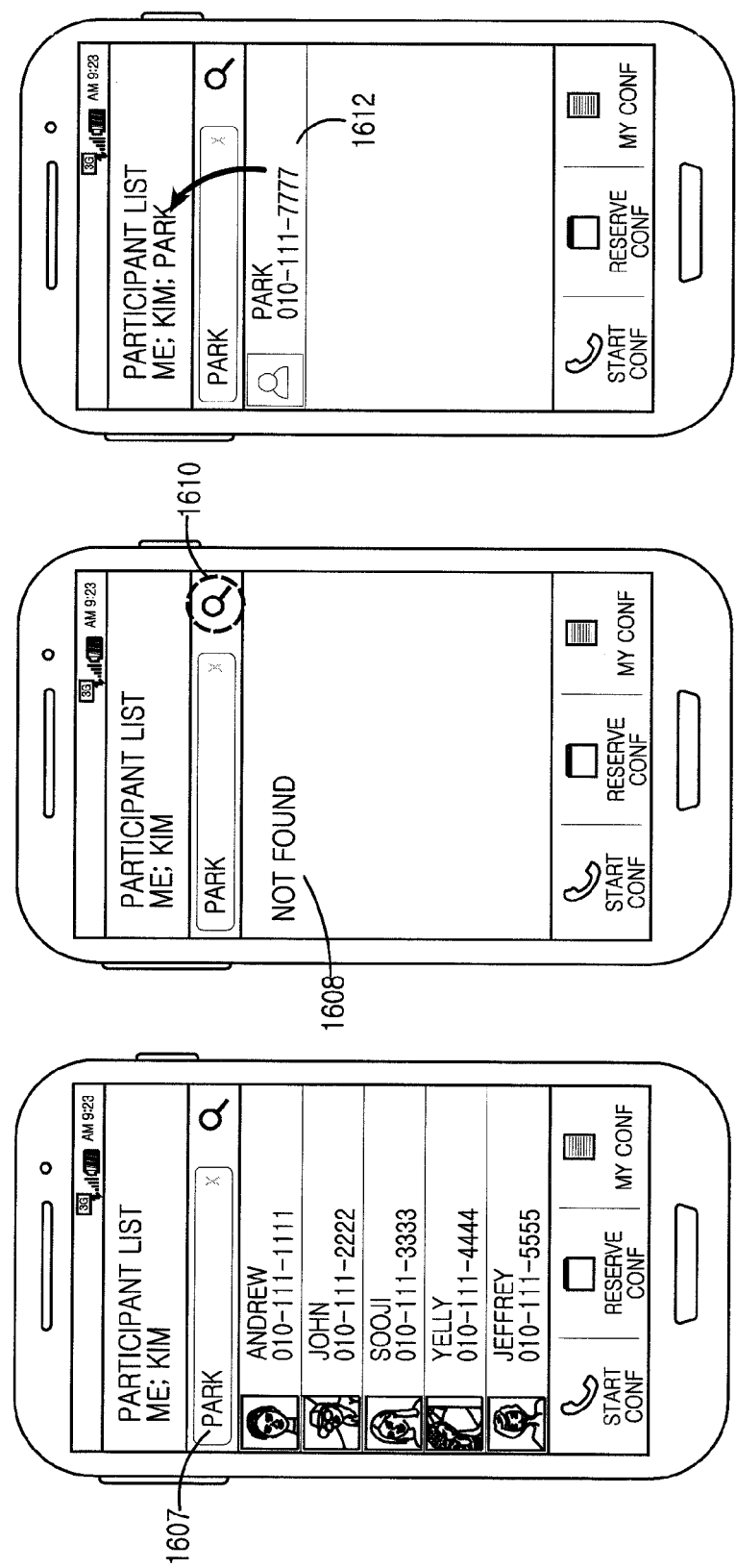
Figure 16C:
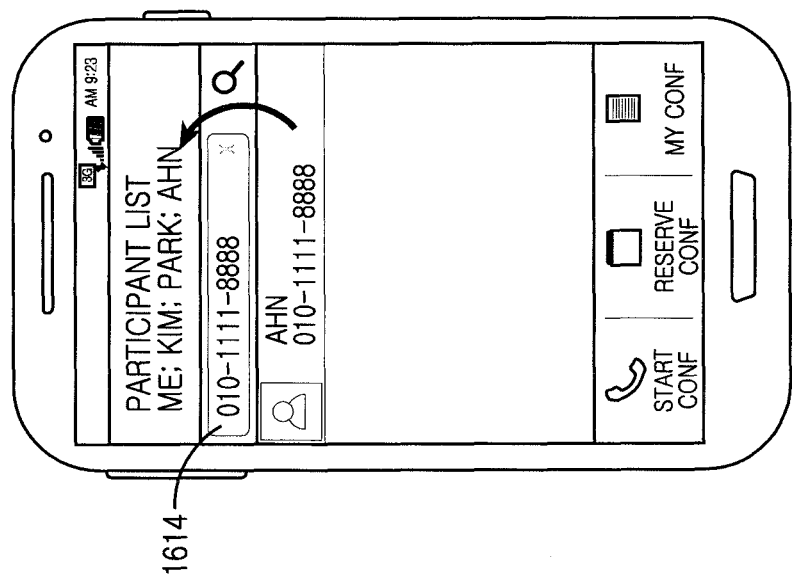

FIGS. 16A-16C depict screens of a portable terminal which registers a participant of a conference call according to an exemplary embodiment of the present invention.

FIG. 16A depicts the screen of the portable terminal for obtaining the participant information from its stored information according to an exemplary embodiment of the present invention.

Referring to FIG. 16A, the stored information may include the phone book information registered to the portable terminal, the recent call list, the user's phone number registered to the bookmark, the incoming/outgoing message information, the user's e-mail information, the user ID, the account, and the recent conference record.

The portable terminal displays the stored information list 1601 and receives a participant name 1603 to register from the user. The portable terminal obtains participant information 1605 corresponding to the name input by the user in the displayed list, and controls to add the participant information to the participant list. In FIG. 16A, the host (Me) and the user KIM are registered as the participants of the conference call.

FIG. 16B depicts the screen of the portable terminal for obtaining the participant information from the information registered to the network according to an exemplary embodiment of the present invention.

Referring to FIG. 16B, the information registered with the network may include the web address book information, the information stored in the cloud system, and the user information registered with the groupware. The portable terminal displays its stored information list and receives a participant name 1607 to register from the user. When the displayed list does not include the participant name input by the user, the portable terminal may display information 1608 indicating no participant information.

The portable terminal may obtain the participant information from the information registered with the network, in addition to its stored information. When the user selects a menu 1610 to search for the participant information in the information registered to the network, the portable terminal obtains the participant information corresponding to the participant name input by the user from the information registered with the network, and controls to add the obtained information 1612 to the participant list. In FIG. 16B, the user PARK identified from the network information is added to the participant list including the host (Me) and the user KIM.

FIG. 16C depicts the screen of the portable terminal for obtaining the participant information according to an exemplary embodiment of the present invention.

Referring to FIG. 16C, the portable terminal may obtain the participant information from its stored information and the information registered to the network as mentioned above. While the participant information is obtained using the participant name in FIGS. 16A and 16B, the portable terminal may obtain the participant information even using the phone number.

The portable terminal displays its stored information list, receives the participant name 1607 to register from the user, obtains the participant information corresponding to the phone number by retrieving the participant's phone number 1614 input by the user from its stored information and the information registered to the network, and controls to add the obtained information to the participant list. In FIG. 16C, the participant AHN retrieved using the phone number is added to the participant list including the host (Me) and the users KIM and PARK.

The portable terminal may display the participant's name and phone number searched by obtaining the participant information, and may display the conference call list including the added participant together.

FIGS. 17A-17D depict screens of a portable terminal which controls a conference call according to an exemplary embodiment of the present invention.

Referring to FIGS. 17A-17D, when the conference call function commences, the portable terminal displays attendance (present user list and an absent user list) 1701 of the conference call and a control menu 1703 including the conference call control function.

The control menu includes a menu (my conference menu) for managing the conference call history, a menu (transmission voice silence menu) for blocking the user voice from being sent to the other party, a menu (speaker phone) for conducting the conference call on a speaker, a menu (conference end) for terminating the conference call, a menu (lecture mode) for blocking the voice of the participant, and a menu (add participant) for adding a new participant to the current conference call. The main screen may also include the conference call history management function as described earlier.

A type of the abovementioned control menu is defined according to an exemplary embodiment of the present invention, and is changeable by a provider or the user.

The portable terminal may expel the present user or invite an absent user while the attendance of the conference call is being displayed. The user of the portable terminal may select an expulsion icon 1705 of the participant list of FIG. 17A to expel the corresponding participant from the conference call, and select an invitation icon 1707 of an absent participant to make the corresponding participant to join in the conference call.

Figure 17A:
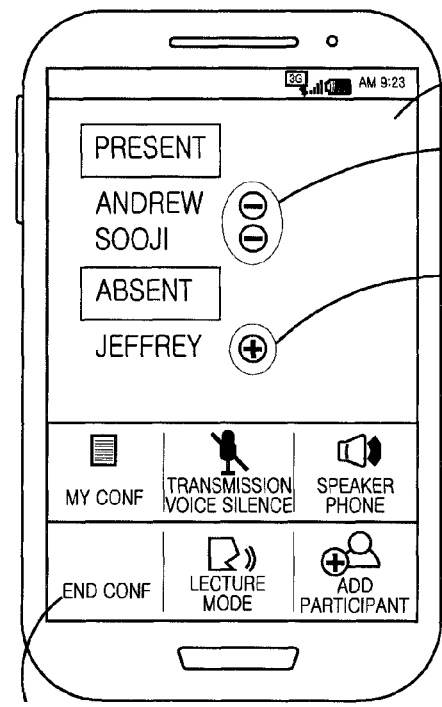
FIGS. 17A-17D depict screens of a portable terminal which controls a conference call according to an exemplary embodiment of the present invention.
Figure 17B:
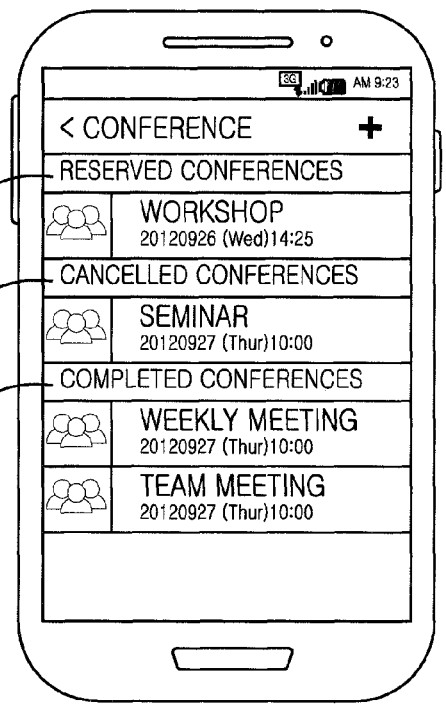

When displaying the control menu including the conference call control function as shown in FIG. 17A and detecting an execution request of the conference call history management function, the portable terminal displays not only the reserved conference call list 1709 but also the completed/cancelled conference call lists 1711 and 1713 as shown in FIG. 17B.

The portable terminal may edit the displayed conference call list. According to the user's input, the portable terminal may change or delete the conference call schedule, or add a new conference call schedule by changing the schedule with the participant of the completed conference.

Figure 17C:
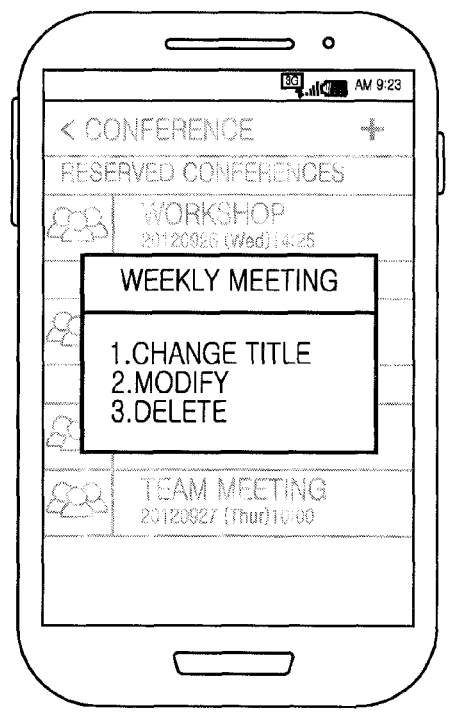

FIG. 17C depicts the screen for editing the completed conference call (weekly meeting). When the user changes or deletes the conference call schedule, or adds a new schedule, the portable terminal can guide the editing to the participant of the corresponding conference call using a text message, an instant message, and an e-mail.

Figure 17D:
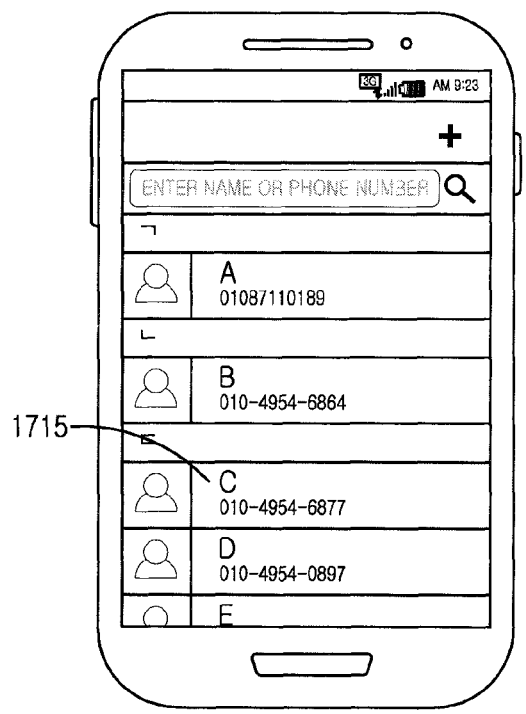

When displaying the control menu including the conference call control function and detecting the execution request to add a participant as shown in FIG. 17A, the portable terminal displays information 1715 for identifying the participant as shown in FIG. 17D. The displayed information can include at least one of the phone book information, the recent call list, the user's phone number registered to the bookmark, the incoming/outgoing message information, the user's e-mail information, the user ID, the account, the recent conference record, the information registered to the groupware, the information registered to the cloud system, and the information registered to the web address book.

Figure 18B:
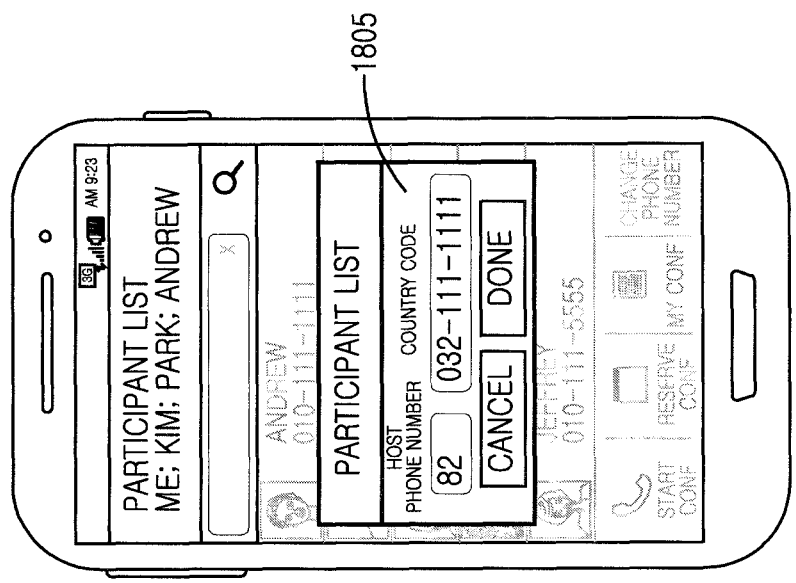
FIGS. 18A and 18B depict screens of a portable terminal which modifies a conference call connection number of a host according to an exemplary embodiment of the present invention.
Figure 18A:
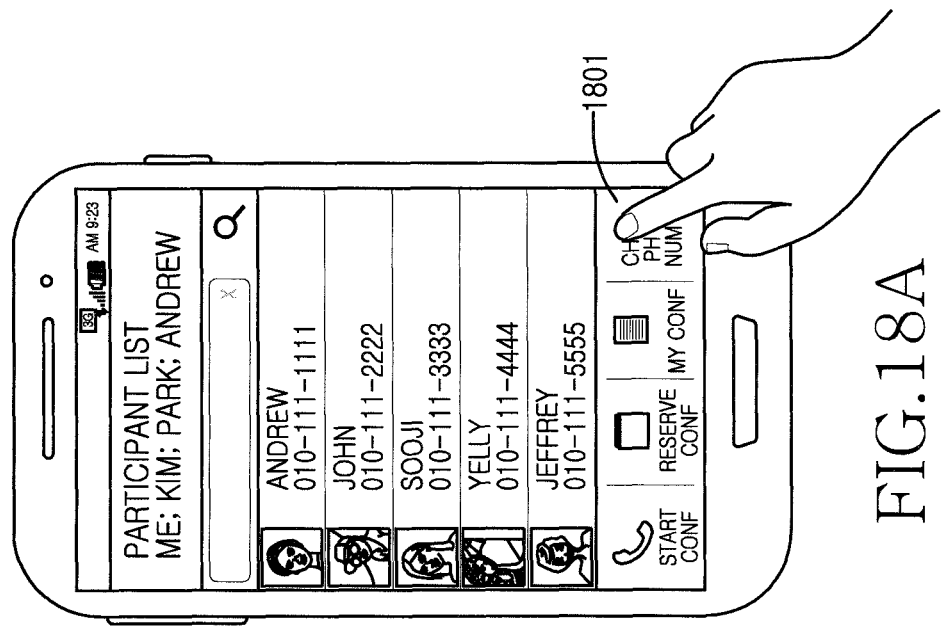

FIGS. 18A and 18B depict screens of a portable terminal which modifies a conference call connection number of a host according to an exemplary embodiment of the present invention.

Referring to FIGS. 18A and 18B, the portable terminal merely controls the conference call execution (participant selection and schedule selection). Other devices (e.g., a phone without the conference call function) can receive the actual conference call connection.

When the conference call execution is requested while the list of the conference call participants is registered, the portable terminal sends the information of the conference call participants (including the host) to the conference server so that each participant can receive the conference call. However, when the host of the conference call wants to receive the conference call using other telephone and an input 1801 requesting to change the number is detected as shown in FIG. 18A, the portable terminal registers a new phone number 1805 for receiving the conference call as shown in FIG. 18B. Accordingly, the host can receive the conference call with the phone of the newly registered phone number.

When the connection number of the host is changed in FIG. 18, the portable terminal may change the connection number of the participant. For example, the connection number of the participant may be changed when a participant, who does not carry a portable terminal, needs the connection with another phone number or when the connection number of the participant using a plurality of terminals is changed.

Figure 19A:
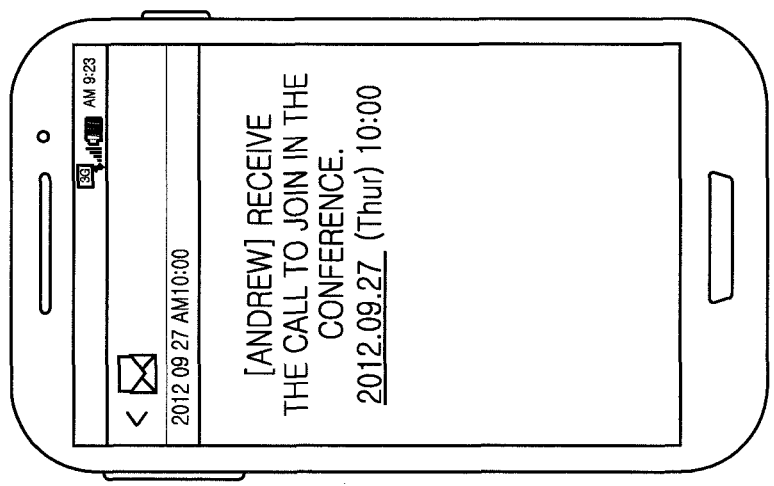
FIGS. 19A and 19B depict diagrams of screens of a portable terminal which receives a message requesting to participate in a conference call according to an exemplary embodiment of the present invention.
Figure 19B:
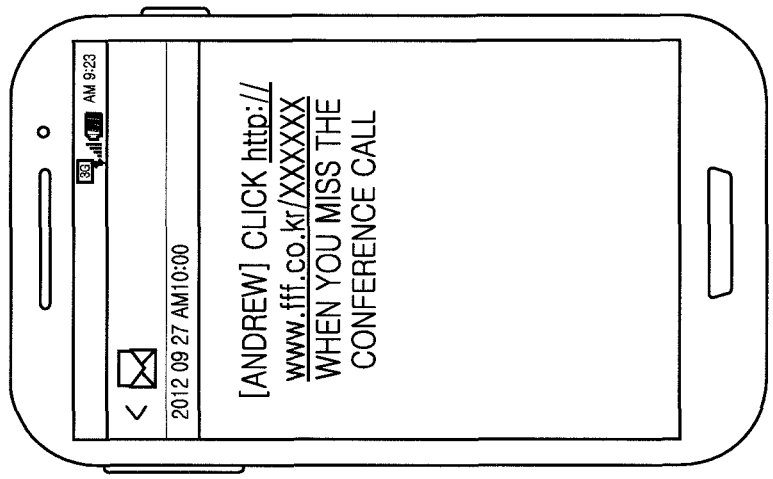

FIGS. 19A and 19B depict screens of a portable terminal which receives a message requesting to participate in a conference call according to an exemplary embodiment of the present invention.

Referring to FIGS. 19A and 19B, when the host executes the conference call, the participant of the conference call receives a message such as the message shown in FIG. 19A. Using the message, the conference server informs the participant (Andrew) that the conference call will be received before the conference call.

When the host reserves the conference call, the conference call reservation information is transmitted to every participant. When the conference call is immediately connected or the commencement of or reserved conference call approaches, the message indicating the start of the conference call is transmitted.

When the host edits the conference call (change or cancel the schedule), a message of the edited conference call is sent to each participant. Such messages can be transmitted to the participant using text messages or e-mail.

A participant not attending the current conference call may receive a message such as the message shown in FIG. 19B. The message provides the conference call connection information so that the absent participant (Andrew) can join in the conference call in person. The absent participant (Andrew) receiving the message clicks information (e.g. a link) in the message so that the conference server can receive the conference call request.

The user attending the conference call may also receive the message including the conference call connection information. This enables a participant unexpectedly disconnected from the conference call to rejoin the conference call using the connection information.

As set forth above, to improve the conference call service quality in the mobile communication system, the portable terminal reserves the conference call and the conference server leads the conference call participant to take part in the conference call. Accordingly, the conference call may be used easily.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device for providing a conference call function, the electronic device comprising:
   at least one processor;
   a memory; and
   at least one program stored in the memory and configured for execution by the at least one processor,
   wherein the program comprises an instruction for:
      displaying a main screen which comprises at least one of:
         a region for displaying a conference call participant candidate list and a region for searching for a conference call participant,
         a region for displaying a list of participants selected as conference call members, and
         a region for displaying a conference call execution menu,
      adding a user selected in the displayed candidate list when a user is selected, to a list of participants selected,
      conducting a conference call with the user added to the list of the selected participants,
      identifying a participant to take part in the conference call by detecting the input data for an IDentifier (ID), sending participant schedule information corresponding to the identified participant to a conference server, and
      generating conference call reservation information comprising an available conference call schedule by receiving the participant schedule information from the conference server.

2. The electronic device of claim 1, wherein the program comprises an instruction for conducting the conference call with the selected participant immediately, or controlling to conduct the conference call with the selected participant on a preset date.

3. The electronic device of claim 1, wherein the program comprises an instruction for displaying at least one of a menu for commencing the conference call, a menu for reserving the conference call, and a menu for searching a conference call history, in a region which displays the conference call execution menu.

4. The electronic device of claim 1, wherein the program comprises an instruction for changing a conference call connection number of the conference call participant.

5. The electronic device of claim 1, wherein the program comprises an instruction for, when the conference call is conducted, displaying at least one of a menu for searching a conference call history, a menu for selecting a call mode, a menu for terminating the conference call, a menu for adding a participant, and conference call attendance.

6. The electronic device of claim 1, wherein the program comprises an instruction for registering conference call reservation information with a schedule management function.

7. The electronic device of claim 1, wherein the ID comprises at least one of a phone book, an address book registered with the web site, recent received/sent call information, incoming/outgoing message information, user e-mail information, and a user ID.

8. The electronic device of claim 1, wherein the program comprises an instruction for sending conference call reservation information to a participant terminal.

9. The electronic device of claim 1, wherein the program comprises an instruction for identifying a participant to take part in the conference call by detecting the input data for an IDentifier (ID), sending corresponding participant information to a conference server, and receiving conference call reservation information comprising an available conference call schedule generated by the conference server.

10. A method for providing a conference call function in an electronic device, the method comprising:
    displaying a main screen which comprises at least one of a region for displaying a conference call participant candidate list and a region for searching for a conference call participant, a region for displaying a list of participants selected as conference call members, and a region for displaying a conference call execution menu;
    adding a user selected in the displayed candidate list when a user is selected, to the list of participants selected;
    generating conference call reservation information comprising an available conference call schedule by receiving participant schedule information;
    transmitting the conference call reservation information to the participant terminal; and
    conducting a conference call with the user added to the list of the selected participants,
    wherein the conference call reservation information is transmitted to the participant terminal via the conference server.

11. The method of claim 10, further comprising:
    conducting the conference call with the selected participant immediately, or controlling to conduct the conference call with the selected participant on a preset date.

12. The method of claim 10, wherein the region which displays the conference call execution menu comprise at least one of a menu for commencing the conference call, a menu for reserving the conference call, and a menu for searching a conference call history, in a region which displays the conference call execution menu.

13. The method of claim 10, further comprising:
    changing a conference call connection number of the conference call participant.

14. The method of claim 10, further comprising:
    when the conference call is conducted, displaying at least one of a menu for searching a conference call history, a menu for selecting a call mode, a menu for terminating the conference call, a menu for adding a participant, and conference call attendance.

15. The method of claim 10, further comprising:
    registering the conference call reservation information with a schedule management function.

16. The method of claim 10, further comprising:
    using at least one of a phone book, an address book registered with the web site, recent received/sent call information, incoming/outgoing message information, user e-mail information, and a user ID as the conference call candidate list.

17. The method of claim 10, further comprising:
identifying a participant to take part in the conference call;
sending participant information to the conference server; and
receiving conference call reservation information comprising an available conference call schedule generated by the conference server.

* * * * *